United States Patent
Itoh et al.

(10) Patent No.: US 6,635,705 B2
(45) Date of Patent: Oct. 21, 2003

(54) OLEFINIC THERMOPLASTIC ELASTOMER COMPOSITION AND METHOD FOR PRODUCING THE SAME

(75) Inventors: Yuichi Itoh, Chiba (JP); Kyoko Kobayashi, Chiba (JP); Akira Uchiyama, Chiba (JP); Masaaki Kawasaki, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/986,477

(22) Filed: Nov. 8, 2001

(65) Prior Publication Data

US 2002/0055591 A1 May 9, 2002

Related U.S. Application Data

(62) Division of application No. 09/604,820, filed on Jun. 28, 2000, now abandoned.

(30) Foreign Application Priority Data

Jun. 28, 1999 (JP) ............ 11-181023
Jun. 28, 1999 (JP) ............ 11-181025
Jun. 28, 1999 (JP) ............ 11-181026

(51) Int. Cl.$^7$ .............. C08L 23/16; C08L 23/06; C08L 23/08; C08L 23/12; C08L 23/22
(52) U.S. Cl. .............. 524/525; 524/526; 525/240; 526/943
(58) Field of Search .............. 524/398, 413, 524/525, 526, 582, 585; 525/240, 191; 526/158, 943

(56) References Cited

U.S. PATENT DOCUMENTS

| | | | |
|---|---|---|---|
| 4,259,230 A | 3/1981 | Simons | |
| 4,454,092 A * | 6/1984 | Shimizu et al. | 264/349 |
| 4,912,148 A | 3/1990 | Kim et al. | |
| 5,086,121 A | 2/1992 | Hazelton et al. | |
| 5,264,476 A | 11/1993 | Daimon et al. | |
| 5,292,587 A * | 3/1994 | Funaki et al. | 428/402 |
| 5,292,845 A | 3/1994 | Kawasaki et al. | |
| 5,696,214 A | 12/1997 | Sagane et al. | |
| 5,756,575 A | 5/1998 | Kawasaki et al. | |
| 5,829,804 A | 11/1998 | Saeki et al. | |
| 5,856,399 A * | 1/1999 | Itoh et al. | 524/505 |
| 5,914,372 A | 6/1999 | Hasegawa et al. | |
| 6,087,443 A | 7/2000 | Sadatoshi et al. | |
| 6,111,021 A * | 8/2000 | Hakaham et al. | 525/232 |

FOREIGN PATENT DOCUMENTS

| | | |
|---|---|---|
| EP | 547843 A1 * | 6/1993 |
| EP | 0748842 A1 | 12/1996 |
| EP | 0751182 A1 | 1/1997 |
| EP | 0969042 A1 | 1/2000 |
| JP | 912790 | 1/1997 |

* cited by examiner

Primary Examiner—Callie Shosho
(74) Attorney, Agent, or Firm—Birch, Stewart, Kolasch & Birch, LLP

(57) ABSTRACT

The present invention relates to an olefinic thermoplastic elastomer composition which comprises a crystalline polyolefin resin (A), an ethylene-α-olefin-non-conjugated polyene copolymer rubber (B) and at least on rubber (C) selected from polyisobutylene, butyl rubber and a propylene-ethylene copolymer rubber having a propylene content of 50 mol % or more or an ethylene-α-olefin copolymer (D) having a density of 0.870 to 0.940 (g/cm$^3$) and an ethylene content of 85 mol % or more, said ethylene-α-olefin-non-conjugated polyene copolymer rubber (B) being crosslinked thermoplastic elastomer composition, being obtained by random copolymerization of ethylene, and α-olefin having 3 to 20 carbon atoms and a non-conjugated polyene in the presence of a metallocene catalyst, (1) containing the unit (a) derived from the ethylene and the unit (b) derived from the α-olefin in a molar ratio of 40/60 to 95/5 [(a)/(b)], (2) having an iodine value of 1 to 50 and (3) having an intrinsic viscosity [η] measured in decalin at 135° C. of 1.0 to 10 dl/g; and relates to a method for manufacturing the same.

5 Claims, No Drawings

OLEFINIC THERMOPLASTIC ELASTOMER COMPOSITION AND METHOD FOR PRODUCING THE SAME

This application is a divisional of application Ser. No. 09/604,820, filed on Jun. 28, 2000 now abandoned, the entire contents of which are hereby incorporated by reference and for which priority is claimed under 35 U.S.C. §120; and this application claims priority of Application No. 181023/1999; 181025/1999 and 181026/1999 filed in JAPAN on Jun. 28, 1999 under 35 U.S.C. §119.

BACKGROUND OF THE INVENTION

The present invention relates to an olefinic thermoplastic elastomer composition, more particularly to an olefinic thermoplastic elastomer composition that can provide a molded product excellent in tensile strength and tensile elongation at break and the like and to a method for producing the same.

An olefinic thermoplastic elastomer composition, being light and easy to be recycled, is widely used for automobile parts, industrial machine parts, electronic/electric instrument parts, construction materials and the like as an energy-saving and resources-saving thermoplastic elastomer particularly in place of a vulcanized rubber.

The conventional olefinic thermoplastic elastomer, however, has the defect that it has poorer tensile strength and tensile elongation at break compared to a vulcanized rubber, and improving the defect has been desired strongly.

As one of the olefinic thermoplastic elastomers having these characteristics improved, there has been proposed a thermoplastic elastomer comprising an ethylene-α-olefin-non-conjugated polyene copolymer polymerized by using a metallocene catalyst. (JP-A-9-012790)

However, although such a thermoplastic elastomer possesses improved tensile strength, tensile elongation at break and compression set compared to the conventional thermoplastic elastomer, the characteristics are still inferior to those of the vulcanized rubber, and a further improvement has been desired.

The inventors found, as a result of the study to solve the foregoing problem, that a thermoplastic elastomer which was further enhanced in tensile strength and tensile elongation at break could be obtained by using a specified rubber in a specified proportion.

Moreover, the inventors found that a thermoplastic elastomer further excellent in tensile strength, tensile elongation at break and compression set could be obtained by dynamically heat treating a crystalline polyolefin resin and an ethylene-α-olefin-non-conjugated polyene copolymer rubber under specified conditions in the presence of a crosslinking agent, thus accomplishing the present invention.

OBJECTS AND SUMMARY OF THE INVENTION

The present invention is to solve the problem of the prior art technology as mentioned above and to provide a thermoplastic elastomer composition superior in the characteristics of tensile strength, tensile elongation at break and the like.

The present invention includes the following inventions.
(i) An olefinic thermoplastic elastomer composition comprising 10 to 60 wt. parts of a crystalline polyolefin resin (A), 88 to 38 wt. parts of an ethylene-α-olefin-non-conjugated polyene copolymer rubber (B) consisting of ethylene, an α-olefin having 3 to 20 carbon atoms and a non-conjugated polyene and 2 to 30 wt. parts of at least one rubber (C) selected from polyisobutylene, butyl rubber and a propylene-ethylene copolymer rubber having a propylene content of 50 mol % or more,(the total of (A), (B) and (C) being 100 wt. parts), said ethylene-α-olefin-non-conjugated polyene copolymer rubber (B) being a crosslinked thermoplastic elastomer composition, said ethylene-α-olefin-non-conjugated polyene copolymer rubber (B) being obtained by random copolymerization of ethylene, an α-olefin of 3 to 20 carbon atoms and a non-conjugated polyene in the presence of a metallocene catalyst, (1) containing the unit (a) derived from the ethylene and the unit (b) derived from the α-olefin of 3 to 20 carbon atoms in a molar ratio of 40/60 to 95/5 [(a)/(b)], (2) having an iodine value of 1 to 50, and (3) having an intrinsic viscosity [η] measured in decalin at 135° C. of 1.0 to 10 dl/g.

(ii) An olefinic thermoplastic elastomer composition comprising 10 to 60 wt. parts of a crystalline polyolefin resin (A), 88 to 38 wt. parts of an ethylene-α-olefin-non-conjugated polyene copolymer rubber (B) consisting of ethylene, an α-olefin having 3 to 20 carbon atoms and a non-conjugated polyene and 2 to 40 wt. parts of an ethylene-α-olefin copolymer (D) having a density of 0.870 to 0.940 (g/cm$^3$) and an ethylene content of 85 mol % or more (the total of (A), (B) and (D) being 100 wt. parts), said ethylene-α-olefin-non-conjugated polyene copolymer rubber (B) being a crosslinked thermoplastic elastomer composition, said ethylene-α-olefin-non-conjugated polyene copolymer rubber (B) being obtained by random copolymerization of ethylene, an α-olefin of 3 to 20 carbon atoms and a non-conjugated polyene in the presence of a metallocene catalyst, (1) containing the unit (a) derived from the ethylene and the unit (b) derived from the α-olefin of 3 to 20 carbon atoms in a molar ratio of 40/60 to 95/5 [(a)/(b)], (2) having an iodine value of 1 to 50, and (3) having an intrinsic viscosity [η] measured in decalin at 135° C. of 1.0 to 10 dl/g.

(iii) A thermoplastic elastomer composition according to said (i) or (ii), wherein said ethylene-α-olefin-non-conjugated polyene copolymer has (4) a $[g\eta^*(=[\eta]/[\eta]_{blank})]$ of 0.2 to 0.95 which is a ratio of the intrinsic viscosity [η] measured as above-mentioned (3) to the intrinsic viscosity $[\eta]_{blank}$ measured in decalin at 135° C. for a linear ethylene-propylene copolymer having an ethylene content of 70 mol % and having the same weight average molecular weight (by light scattering method) as the ethylene-α-olefin-non-conjugated polyene copolymer rubber having that intrinsic viscosity [η].

(iv) A thermoplastic elastomer composition according to said (iii), wherein said ethylene-α-olefin-non-conjugated polyene copolymer rubber (B) has (5) an intensity ratio D(Tαβ/Tαα) (a ratio of Tαβ to Tαα in $^{13}$C-NMR spectrum) of 0.5 or less, has (6) a B value of 1.00 to 1.50 which is obtained from $^{13}$C-NMR spectrum and the following formula, $$B \text{ value} = [P_{OE}]/(2 \cdot [P_E] \cdot [P_O])$$

wherein, $[P_E]$ being a molar fraction of the unit (a) derived form ethylene in the random copolymer rubber, $[P_O]$ being a molar fraction of the unit (b) derived from α-olefin in the random copolymer rubber, and $[P_{OE}]$ being a ratio of the α-olefin/ethylene chain number to the total dyad chain number in the random copolymer rubber, and has (7) a glass transition temperature (Tg) obtained by DSC of −50° C. or lower.

(v) A thermoplastic elastomer composition according to any of said (i) to (iv) which is produced by dynamic heat treatment according to the conditions shown in the following formula, $$5.5 < 2.2\log X + \log Y - \log Z + (T-180) \div 100 < 6.5$$

(wherein T is a resin temperature (° C.) at the die exit of extruder, X is a screw diameter (mm) of extruder, Y is a maximum shear rate (sec$^{-1}$) generated in extruder and Z is an extrusion amount (kg/h.).

(vi) A thermoplastic elastomer composition according to said (v) which is produced by dynamic heat treatment in the presence of a crosslinking agent.

(vii) A thermoplastic elastomer composition according to said (vi), wherein said crosslinking agent is an organic peroxide.

(viii) A thermoplastic elastomer composition according to any of said (i) to (vii) which contains 2 to 100 wt. parts of a softening agent (E) and/or 2 to 100 wt. parts of an inorganic filler (F) to the total 100 wt. parts of said crystalline polyolefin resin (A), ethylene-α-olefin-non-conjugated polyene copolymer rubber (B), and at least one rubber (C) selected from polyisobutylene, butyl rubber and a propylene-ethylene copolymer rubber having a propylene content of 50 mol % or more or an ethylene-α-olefin copolymer (D) having a density of 0.870 to 0.940 (g/cm$^3$) and an ethylene content of 85 mol % or more.

(ix) A method for producing an olefinic thermoplastic elastomer composition characterized by dynamically heat treating, in the presence of a crosslinking agent under the below-mentioned conditions, 10 to 60 wt. parts of a crystalline polyolefin resin (A), 90 to 40 wt. parts of an ethylene-α-olefin-non-conjugated polyene copolymer rubber (B) consisting of ethylene, an α-olefin having 3 to 20 carbon atoms and a non-conjugated polyene [the total of (A) and (B) being 100 wt. parts], said conditions being according to the following formula, $$5.5 < 2.2\log X + \log Y - \log Z + (T-180) \div 100 < 6.5$$

wherein T is a resin temperature (° C.) at the die exit of extruder, X is a screw diameter (mm) of extruder, Y is a maximum shear rate (sec$^{-1}$) generated in extruder and Z is an extrusion amount (kg/h.).

(x) A manufacturing method according to said (ix), wherein said ethylene-α-olefin-non-conjugated polyene copolymer rubber (B) is obtained by random copolymerization of from ethylene, an α-olefin having 3 to 20 carbon atoms and a non-conjugated polyene, has (1) the unit (a) derived from the ethylene and the unit (b) derived from the α-olefin of 3 to 20 carbon atoms in a molar ratio of 40/60 to 95/5 [(a)/(b)], has (2) an iodine value of 1 to 50, and has (3) an intrinsic viscosity [η] measured in decalin at 135° C. of 0.1 to 10 dl/g.

(xi) A method for manufacturing an olefinic thermoplastic elastomer composition characterized by dynamically heat treating, according to the conditions shown in the following formula in the presence of a crosslinking agent, 10 to 60 wt. parts of a crystalline polyolefin resin (A), 88 to 38 wt. parts of an ethylene-α-olefin-non-conjugated polyene copolymer rubber (B) which is an ethylene-α-olefin-non-conjugated polyene copolymer rubber consisting of ethylene, an α-olefin having 3 to 20 carbon atoms and a non-conjugated polyene, which is obtained by random polymerization of ethylene, an α-olefin having 3 to 20 carbon atoms and a non-conjugated polyene in the presence of a metallocene catalyst, (1) which has the ethylene-derived unit (a) and the unit (b) derived from the α-olefin with 3 to 20 carbon atoms in a molar ratio of 40/60 to 95/5 [(a)/(b)], (2) which has an iodine value of 1 to 50, (3) which has an intrinsic viscosity [η] of 1.0 to 10 dl/g when measured in decalin at 135° C., and 2 to 30 wt. parts of at least of one rubber (C) selected from polyisobutylene, butyl rubber and a propylene-ethylene copolymer rubber having a propylene content of 50 mol % or more [the total of (A),(B) and (C) is 100 wt. parts], said formula being;

$$5.5 < 2.2\log X + \log Y - \log Z + (T-180) \div 100 < 6.5$$

wherein T is a resin temperature (° C.) at the die exit of extruder, X is a screw diameter (mm) of extruder, Y is a maximum shear rate (sec$^{-1}$) generated in extruder and Z is an extrusion amount (kg/h.).

(xii) A method for manufacturing an olefinic thermoplastic elastomer composition characterized by dynamically heat treating, according to the conditions shown in the following formula in the presence of a crosslinking agent, 10 to 60 wt. parts of a crystalline polyolefin resin (A), 88 to 38 wt. parts of an ethylene-α-olefin-non-conjugated polyene copolymer rubber (B) which is an ethylene-α-olefin-non-conjugated polyene copolymer rubber consisting of ethylene, an α-olefin having 3 to 20 carbon atoms and a non-conjugated polyene, which is obtained by random polymerization of ethylene, an α-olefin having 3 to 20 carbon atoms and a non-conjugated polyene in the presence of a metallocene catalyst, (1) which has the ethylene-derived unit (a) and the unit (b) derived from the α-olefin with 3 to 20 carbon atoms in a molar ratio of 40/60 to 95/5 [(a)/(b)], (2) which has an iodine value of 1 to 50, (3) which has an intrinsic viscosity [η] of 1.0 to 10 dl/g when measured in decalin at 135° C., and 2 to 40 wt. parts of an ethylene-α-olefin copolymer (D) having a densitry of 0.870 to 0.940 (g/cm$^3$) and having an ethylene content of 85 mol % or more [the total of (A),(B) and (D) is 100 wt. parts], said formula being;

$$5.5 < 2.2\log X + \log Y - \log Z + (T-180) \div 100 < 6.5$$

(wherein T is a resin temperature (° C.) at the die exit of extruder, X is a screw diameter (mm) of extruder, Y is a maximum shear rate (sec$^1$) generated in extruder and Z is an extrusion amount (kg/h.)

(xiii) A manufacturing method according to the said (ix) wherein said crosslinking agent is an organic peroxide.

(xiv) An olefinic thermoplastic elastomer composition which is obtainable by the manufacturing method according to said (ix) or (x).

Hereinafter the present invention is explained concretely.

The olefinic thermoplastic elastomer composition of the present invention is a crosslinked thermoplastic elastomer composition, and comprises a crystalline polyolefin resin (A), an ethylene-α-olefin-non-conjugated polyene copolymer rubber (B) and at least one rubber (C) selected from polyisobutylene, butyl rubber and a propylene-ethylene copolymer rubber having a propylene content of 50 mol % or more or an ethylene-α-olefin copolymer (D) having a density of 0.870 to 0.940 (g/cm$^3$) and having an ethylene content of 85 mol % or more.

A method for manufacturing the olefinic thermoplastic elastomer composition of the present invention is featured by dynamically heat treating, according to the specified conditions in the presence of a crosslinking agent, 10 to 60 wt. parts of a crystalline polyolefin resin (A) and 90 to 40 wt. parts of an ethylene-α-olefin-non-conjugated polyene copolymer rubber (B) consisting of ethylene, an α-olefin with 3 to 20 carbon atoms and a non-conjugated polyene [the total of (A) and (B) is 100 wt. parts.]

Crystalline Polyolefin Resin (A)

The crystalline polyolefin resin (A) used in the present invention comprises a crystalline polymeric solid product obtained by polymerizing one or more of mono-olefin by either of the high pressure method or low pressure method. Such resins include isotactic and syndiotactic mono-olefin polymer resins, and the resins representative of these are commercially available.

The raw material olefin suitable for the crystalline polyolefin resin (A) includes, concretely, ethylene, propylene, 1-butene, 1-pentene, 1-hexene, 1-octene, 1-decene, 2-methyl-1-propene, 3-methyl-1-pentene, 4-methyl-1-pentene and 5-methyl-1-hexene. These olefins are used singly or in a mixture of two or more.

Any polyemrization type, regardless of random or block type, can be adpoted as long as it produces resinous substances.

These crystalline polyolefin resins can be used singly or in a combination of two or more.

The crystalline polyolefin resin (A) used in the present invention has a MFR (ASTM D-1238-65T, 230° C.) in the range of usually 0.01 to 100 g/10 min., preferably 0.05 to 50 g/10 min.

The crystalline polyolefin resin (A) has a role of improving the flow and heat resistance of the composition.

In the olefinic thermoplastic elastomer composition of the present invention, the crystalline polyolefin resin (A) is used in a ratio of 10 to 60 wt. parts, preferably 15 to 55 wt. parts to the total 100 wt. parts of the crystalline polyolefin resin (A), an ethylene-α-olefin-non-conjugated polyene copolymer rubber (B) and at least one rubber (C) selected from polyisobutylene, butyl rubber and a propylene-ethylene copolymer rubber having a propylene content of 50 mol % or more or an ethylene-α-olefin copolymer (D) having a density of 0.870 to 0.940 (g/cm$^3$) and having an ethylene content of 85 mol % or more.

In the method for manufacturing the olefinic thermoplastic elastomer composition of the present invention, the crystalline polyolefin resin (A) is used in a ratio of 10 to 60 wt. parts, preferably 15 to 55 wt. parts against the total 100 wt. parts of the crystalline polyolefin resin (A) and an ethylene-α-olefin-non-conjugated polyene copolymer rubber (B).

Using the crystalline polyolefin resin (A) in the above-mentioned ratio gives excellent rubber elasticity and in addition gives an olefinic thermoplastic elastomer composition excellent in moldability.

Ethylene-α-olefin-non-conjugated Polyene Copolymer Rubber (B)

The ethylene-α-olefin-non-conjugated polyene copolymer rubber (B) used in the olefinic thermoplastic elastomer composition of the present invention is obtained by random copolymerizing ethylene, a $C_3$–$C_{20}$ α-olefin and a non-conjugated polyene in the presence of a metallocene catalyst mentioned later.

The ethylene-α-olefin-non-conjugated polyene copolymer rubber (B) used in the method of producing the olefinic thermoplastic elastomer composition of the present invention is obtained by random copolymerizing ethylene, a $C_3$–$C_{20}$ α-olefin and a non-conjugated polyene in the presence of a suitable catalyst such as metallocene catalyst, titanium non-metallocene catalyst and vanadium catalyst.

The ethylene-α-olefin-non-conjugated polyene copolymer rubber (B) may have either of the molecular structures of the straight chain or branched long chain, but the structure of the branched long chain is preferable.

The above-mentioned α-olefin having 3 to 20 carbon atoms includes propylene, 1-butene, 1-pentene, 1-hexene, 1-heptene, 1-octene, 1-nonene, 1-decene, 1-undecne, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and combinations thereof.

Of these, as the α-olefin composing a straight chain ethylene-α-olefin-non-conjugated polyene copolymer rubber, the α-olefin of 4 to 10 carbon atoms is preferable, and particularly preferred are 1-butene, 1-hexene, 1-octene and 1-decene.

Further, as the α-olefin composing a branched long chain ethylene-α-olefin-non-conjugated polyene copolymer rubber, the α-olefin having 3 to 10 carbon atoms is preferred, and particularly preferably used are propylene, 1-butene, 1-hexene and 1-octene.

The non-conjugated polyene composing the straight chain ethylene-α-olefin-non-conjugated polyene copolymer rubber includes aliphatic, alicyclic and aromatic polyenes.

The foregoing aliphatic polyene includes, concretely, 1,4-hexadiene, 1,5-hexadiene, 1,6-heptadiene, 1,6-octadiene, 1,7-octadiene, 1,8-nonadiene, 1,9-decadiene, 1,13-tetradecadiene, 3-methyl-1,4-hexadiene, 4-methyl-1,4-hexadiene, 5-methyl-1,4-hexadiene, 4-ethyl-1,4-hexadiene, 3-methyl-1,5-hexadiene, 3,3-dimethyl-1,4-hexadiene, 3,4-dimethyl-1,5-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 3-methyl-1,6-heptadiene, 4-methyl-1,6-heptadiene, 4,4-dimethyl-1,6-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1, 4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1, 6-decadiene, 7-ethyl-1, 6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene and 9-methyl-1,8-undecadiene.

The aforementioned alicyclic polyene includes, concretely, vinylcyclohexene, vinylnorbornene, ethylidenenorbornene (for example, 5-ethylidene-2-norbornene), dicyclopentadiene, cyclooctadiene, 2,5-norbornadiene, 1,4-divinylcyclohexane, 1,3-divinylcyclohexane, 1,3-divinylcyclopentane, 1,5-divinylcyclooctane, 1-allyl-4-vinylcyclohexane, 1,4-diallylcyclohexane, 1-allyl-5-vinylcyclooctane, 1,5-diallylcyclooctane, 1-allyl-4-isopropenylcyclohexane, 1-isopropenyl-4-vinylcyclohexane, and 1-isopropenyl-3-vinylcyclopentane.

The aromatic polyene mentioned above includes, concretely, divinylbenzene and vinylisopropenylbenzene.

Of these, a non-conjugated polyene having 7 or more carbon atoms is preferable, and methyloctadiene such as 7-methyl-1,6-octadiene, ethylidene norbornene such as 5-ethylidene-2-norbornene and dicyclopentadiene are preferably used. These non-conjugated polyenes can be used singly or in a combination of two or more.

The non-conjugated polyene composing the branched long chain ethylene-α-olefin-non-conjugated polyene copolymer rubber is a non-conjugated polyene in which there exists only one carbon—carbon double bond in the molecule that is polymerizable by a metallocene catalyst and the like. Such polyenes do not include chain type polyenes which have vinyl groups on both terminals. Of the two or more vinyl groups, if one is located on a terminal, preferably another takes the internal olefin structure, not being positioned on a terminal. Such non-conjugated polyenes include aliphatic and alicyclic polyenes.

The above-mentioned aliphatic polyene includes, concretely, 1,4-hexadiene, 3-methyl-1,4-hexadiene, 4-methyl-1,4-hexadiene, 5-methyl-1,4-hexadiene, 4-ethyl-1,4-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene and 9-methyl-1,8-undecadiene.

The alicyclic polyene mentioned previously is preferably a polyene composed of the alicyclic portion having one unsaturated bond and the chain portion having the internal olefin bond, and includes 5-ethylidene-2-norbornene, 5-isopropylidene-2-norboenene and 6-chloromethyl-5-isopropylidene-2-norbornen. Further, it includes trienes such as 2,3-diisopropylidene-5-norbornene and 2-ethylidene-3-isopropylidene-5-norbornene. Of these non-conjugated polyenes, 5-ethylidene-2-norbornene, 1,4-hexadiene and the like are particularly preferable. These non-conjugated polyenes can be used singly or in combinations of two or more.

The straight chain ethylene-α-olefin-non-conjugated polyene copolymer rubber (B) preferably used in the present invention (hereinafter called copolymer rubber (B)) has the following characteristics.

(1) Ethylene-α-olefin Component Ratio

The copolymer rubber (B) has the unit (a) derived from ethylene and the unit (b) derived from α-olefin of 3 to 20 carbon atoms (hereinafter sometimes simply called α-olefin) in a mole ratio of 40/60 to 95/5, preferably 40/60 to 90/10, more preferably 50/50 to 85/15 [(a)/(b)].

The ethylene-α-olefin-non-conjugated polyene copolymer rubber having such ethylene and α-olefin component ratio is excellent in both of low temperature flexibility and heat resistance.

(2) Iodine Value

The iodine value, an index of the non-conjugated polyene content in the copolymer rubber (B), is 1 to 50, preferably 1 to 30.

(3) Intrinsic Ciscosity[η]

The intrinsic viscosity [η] of the copolymer rubber (B) measured in decalin at 135° C. is 0.1 to 10, preferably 1.5 to 7 dl/g.

(4) g η*

The gη* value of the straight chain copolymer rubber (B) exceeds 0.95.

The gη* value is defined according to the following formula, $$g\eta^* = [\eta]/[\eta]_{blank}$$

(herein, [η] is an intrinsic viscosity measured in the above-mentioned (3), and $[\eta]_{blank}$ is an intrinsic viscosity of the straight chain ethylene-propylene copolymer having the same weight average molecular weight (by light scattering method) as the ethylene-α-olefin-non-conjugated polyene copolymer rubber that has that intrinsic viscosity [η] and also having an ethylene content of 70 mol %.)

When the gη* value of an ethylene-α-olefin-non-conjugated polyene copolymer rubber becomes more than 0.95, branched long chain is not formed in the molecule, that is, it means that the polymer has a straight chain molecular structure. The gη* value can be measured by the method described in JP-B-3(1991)-14045.

Further, it is preferable that this straight chain copolymer rubber (B) satisfies the following charcteristics.

(5) D Value

The intensity (area) ratio D of Tαβ to Tαα(Tαβ/Tαα) in $^{13}$C-NMR spectrum of the copolymer rubber (B) is usually 0.8 or less, preferably 0.5 or less, more preferably 0.3 or less.

The intensity ratio of this random copolymer rubber differs according to the kind of α-olefin composing the random copolymer rubber.

The Tαβ and Tαα in $^{13}$C-NMR spectrum represent respective peak intensities of two different CH$_2$'s at different positions relative to the tertiary carbon atom in the units derived from the α-olefin, as shown in the following formulae:

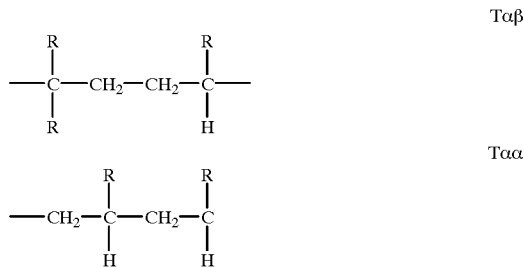

The intensity ratio D of a random copolymer rubber may be determined in the following manner:

$^{13}$C-NMR spectrum of a random copolymer rubber is measured at 67.8 MHz using d$_6$-benzene (128 ppm) standard and a NMR apparatus, such as JEOL-GX270 (JEOL Ltd.), in a mixed solution comprising 5% by weight of a sample in hexachlorobutadiene/d$_6$-benzene (2/1, by volume) at 25° C.

The $^{13}$C-NMR spectrum was analyzed substantially according to the proposal by Lindemann Adams (Analysis Chemistry, 43, p. 1245 (1971)) and J. C. Randall (Review Macromolecular Chemistry Physics, C29, 201 (1989)).

The intensity ratio D is now described in more detail with respect to ethylene-1-butene-7-methyl-1,6-octadiene copolymer rubber as an example.

In the $^{13}$C-NMR spectrum of the ethylene-1-butene-7-methyl-1,6-octadiene copolymer rubber, the peaks appearing at 39 to 40 ppm and 31 to 32 ppm are attributed to Tαα and Tαβ, respectively.

The intensity ratio D is calculated from a ratio of integrated values (areas) of respective peak portions.

An intensity ratio D obtained in this manner has generally been considered to be a measure for indicating the possibility or percentage of 2,1-addition reaction occurring following 1,2-addition of 1-butene, or the possibility or percentage of 1,2-addition reaction occurring following 2,1-addition of 1-butene. Therefore, the higher the intensity ratio D value, the more irregular the orientation of linkage of the -olefin (1-butene). On the contrary, the lower the D value, the more regular the linkage orientation of the -olefin. Such higher regularity is preferable since molecular chains tend to readily aggregate resulting in better properties, such as strength, of the random copolymer rubber.

A random copolymer rubber having the above-mentioned intensity ratio of 0.5 or less can be obtained by copolymerizing ethylene, an α-olefin and a non-conjugated polyene using the specific IV-group (titanium group) metallocene catalyst set forth in JP-A-9-12790 and JP-A-9-137001.

(6) B Value

The copolymer rubber (B) has a B value of usually 0.7 to 2.0, preferably 1.00 to 1.50, which value is obtained from $^{13}$C-NMR spectrum and the following formula, $$B \text{ value}=[P_{OE}]/(2\cdot[P_E]\cdot[P_O])$$

(wherein, $[P_E]$ is a molar fraction of the unit (a) derived from ethylene in the random copolymer rubber, $[P_O]$ is that of the unit (b) derived from α-olefin in the copolymer rubber, and $[P_{OE}]$ is a ratio of the chain number of α-olefin/ethylene to the chain number of the total dyad in the random copolymer rubber.)

This B value is an index indicating the distribution state of the ethylene and α-olefin in the copolymer rubber and can be obtained based on the report by J. C. Randall (Macromolecules, 15, 353(1982)) and J. Ray (Macromolecules, 10, 773(1977)).

The larger the aforementioned B value, the shorter the chain block of ethylene or α-olefin, and it means that the distribution of ethylene and α-olefin is uniform and the composition distribution of the copolymer rubber is narrow. Further, as the B value becomes less and less than 1.00, the composition distribution of the copolymer rubber becomes wider.

A random copolymer rubber having an above-mentioned B value of 1.00 to 1.50 can be obtained by copolymerizing ethylene, an α-olefin and a non-conjugated polyene using the specific IV-group (titanium group) metallocene catalyst set forth in JP-A-9-12790 and JP-A-9-137001.

(7) Glass Transition Temperature

The glass transition temperature (Tg) of the copolymer rubber (B) measured with DSC (differential scanning calorimeter) is usually −40° C. or lower, preferably −50° C. or lower.

On the other hand, the branched long chain copolymer rubber (B) preferably used in the present invention has the following characteristics.

(1) Ethylene-α-olefin Component Ratio

The copolymer rubber (B) has the unit (a) derived from ethylene and the unit (b) derived from α-olefin of 3 to 20 carbon atoms (hereinafter sometimes simply called α-olefin) in a mole ratio of 40/60 to 95/5, preferably 55/45 to 90/10 [(a)/(b)].

The ethylene-α-olefin-non-conjugated polyene copolymer rubber having such ethylene-α-olefin component ratio is excellent in both of low temperature flexibility and heat resistance.

(2) Iodine Value

The iodine value, an index of the content of the non-conjugated polyene in the copolymer rubber (B), is 1 to 50, preferably 5 to 40. The ethylene-α-olefin-non-conjugated polyene copolymer rubber having the above-mentioned iodine value gives a fast vulcanization speed and can undergo high speed vulcanization.

(3) Intrinsic Viscosity [η]

The intrinsic viscosity [η] of the copolymer rubber (B) measured in decalin at 135° C. is 0.1 to 10, preferably 1.2 to 6, more preferably 1.5 to 5 dl/g.

(4) gη* Value

The gη* value of the branched long chain copolymer rubber (B) is 0.2 to 0.95, preferably 0.4 to 0.9, more preferably 0.5 to 0.85.

The gη* value is defined according to the following formula, $$g\eta^*=[\eta]/[\eta]_{blank}$$

(herein, [η] is an intrinsic viscosity measured in the above-mentioned (3), and $[\eta]_{blank}$ is an intrinsic viscosity of the straight chain ethylene-propylene copolymer having the same weight average molecular weight (by light scattering method) as that of the ethylene-α-olefin-non-conjugated polyene copolymer rubber which has that intrinsic viscosity [η] and moreover having an ethylene content of 70 mol %.)

When the gη* value of an ethylene-α-olefin-non-conjugated polyene copolymer rubber becomes 0.95 or less, it shows that branched long chain is formed in the molecule. The gη* value can be measured by the method described in JP-B-3(1991)-14045.

Further, it is preferable that this branched long chain copolymer rubber (B) satisfies the following charcteristics (5) to (7).

(5) D Value

The intensity (area) ratio D of Tαβ to Tαα (Tαβ/Tαα) in $^{13}$C-NMR spectrum of the copolymer rubber (B) is usually 0.8 or less, preferably 0.5 or less, more preferably 0.3 or less.

The intensity ratio, D value, of this random copolymer rubber differs according to the kind of α-olefin composing the random copolymer rubber.

The Tαβ and Tαα in $^{13}$C-NMR spectrum represent respective peak intensities of two different CH$_2$'s at different positions relative to the tertiary carbon atom in the units derived from the α-olefin, as shown in the following formulae:

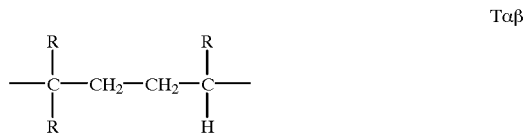

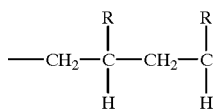

Tαα

The intensity ratio D of a random copolymer rubber may be determined in the following manner:

$^{13}$C-NMR spectrum of a random copolymer rubber is measured at 67.8 MHz using d$_6$-benzene (128 ppm) standard and a NMR apparatus, such as JEOL-GX270 (JEOL Ltd.), in a mixed solution comprising 5% by weight of a sample in hexachlorobutadiene/d$_6$-benzene (2/1, by volume) at 25° C.

The $^{13}$C-NMR spectrum was analyzed substantially according to the proposal by Lindemann Adams (Analysis Chemistry, 43, p. 1245 (1971)) and J. C. Randall (Review Macromolecular Chemistry Physics, C29, 201 (1989)).

The intensity ratio D is now described in more detail with respect to ethylene-1-butene-7-methyl-1,6-octadiene copolymer rubber as an example.

In the $^{13}$C-NMR spectrum of the ethylene-1-butene-7-methyl-1,6-octadiene copolymer rubber, the peaks appearing at 39 to 40 ppm and 31 to 32 ppm are attributed to Tαα and Tαβ, respectively.

The intensity ratio D is calculated from a ratio of integrated values (areas) of respective peak portions.

An intensity ratio D obtained in this manner has generally been considered to be a measure for indicating the possibility or percentage of 2,1-addition reaction occurring following 1,2-addition of 1-butene, or the possibility or percentage of 1,2-addition reaction occurring following 2,1-addition of 1-butene. Therefore, the higher the intensity ratio D value, the more irregular the orientation of linkage of the α-olefin (1-butene). On the contrary, the lower the D value, the more regular the linkage orientation of the -olefin. Such higher regularity is preferable since molecular chains tend to readily aggregate resulting in better properties, such as strength, of the random copolymer rubber.

The present invention provides a random copolymer rubber having the aforementioned intensity ratio D of 0.5 or less by copolymerizing ethylene, an α-olefin and a non-conjugated polyene using the specific IV-group (titanium group) metallocene catalyst described later. However, copolymerizing ethylene, 1-butene and 7-methyl-1,6-octadiene in the presence of, for example, the V-group metallocene catalyst such as vanadium cannot give an ethylene-1-butene-7-methyl-1,6-octadiene copolymer rubber having the intensity ratio D of 0.5 or less. This holds in α-olefins other than 1-butene.

(6) B Value

The copolymer rubber (B) has preferably a B value of usually 0.7 to 2.0, particularly 1.00 to 1.50, which value is obtained from $^{13}$C-NMR spectrum and the following formula, $$B \text{ value}=[P_{OE}]/(2 \cdot [P_E] \cdot [P_O])$$

wherein, $[P_E]$ is a molar fraction of the unit (a) derived from ethylene in the random copolymer rubber, $[P_O]$ is that of the unit (b) derived from α-olefin in the random copolymer rubber, and $[P_{OE}]$ is a ratio of the chain number of α-olefin/ethylene to the chain number of the total dyad in the random copolymer rubber.

This B value is an index indicating the distribution state of the ethylene and α-olefin in the copolymer rubber and can be obtained based on the report by J. C. Randall (Macromolecules, 15, 353(1982)) and J. Ray (Macromolecules, 10, 773(1977)).

The larger the B value, the shorter the chain block of ethylene or α-olefin, and it means that the distribution of ethylene and α-olefin is uniform and the composition distribution of the copolymer rubber is narrow. Further, as the B value becomes less than 1.00, the composition distribution of the copolymer rubber becomes wider. Such copolymer rubber sometimes does not develop sufficiently physical properties such as strength, for example when subjected to crosslinking, in contrast with the copolymer rubber having a narrow composition distribution.

The present invention provides a random copolymer rubber having the aforementioned B value of 1.00 to 1.50 by copolymerizing ethylene, an α-olefin and a non-conjugated polyene using, as described later, the specific IV-group (titanium group) metallocene catalyst. However, copolymerizing ethylene, an α-olefin and a non-conjugated polyene in the presence of, for example, the titanium type non-metallocene catalyst cannot give an ethylene-α-olefin-non-conjugated polyene copolymer rubber having a B value of the above-mentioned range.

(7) Glass Transition Temperature

The glass transition temperature (Tg) of the copolymer rubber (B) measured with DSC (differential scanning calorimeter) is usually −40° C. or lower, preferably −50° C. or lower.

From a random copolymer rubber with −50° C. or lower Tg, there can be obtained a thermoplastic elastomer composition excellent in low temperature flexibility.

The ethylene-α-olefin-non-conjugated polyene copolymer rubber used in the present invention, for example, a random copolymer rubber between ethylene, 1-butene and ethylidenenorbornene (ENB) has about 5 to 10° C. lower glass transition temperature (Tg) compared to that of a copolymer rubber (EPDM) between ethylene, propylene and ENB which copolymer rubber has the same composition ratio of ethylene, α-olefin and non-conjugated polyene as the random copolymer rubber of the invention, and exhibits superior low temperature characteristics.

The straight chain or branched long chain copolymer rubber (B) mentioned above is manufactured by random copolymerizing ethylene, an α-olefin having 3 to 20 carbon atoms and a non-conjugated polyene in the presence of a suitable catalyst such as metallocene catalyst, titanium non-metallocene catalyst and vanadium catalyst. Of the said branched long chain copolymer rubber (B), a preferable one is manufactured by random copolymerization of ethylene, an α-olefin having 3 to 20 carbon atoms and a non-conjugated polyene in the presence of a specific metallocene catalyst. The metallocene catalyst includes those described in, for example, JP-A-12790 and JP-A-9-137001.

As far as the metallocene catalyst contains the metallocene compound [A], the metallocene catalyst is not particularly limited. For example, it may be composed of the metallocene compound [A]; and an organic aluminum oxy compound [B] and/or a compound [C] capable of reacting with the metallocene compound [A] to form an ion pair. Further, it may comprise an organic aluminum compound [D] in addition to the metallocene compound [A], and the organic aluminum oxy compound [B] and/or the compound [C] capable of reacting with the metallocene compound [A] to form an ion pair.

Hereinbelow, the components used in forming the metallocene catalyst will be described.

The metallocene compound [A] may be any compound represented by the following general formula (I):

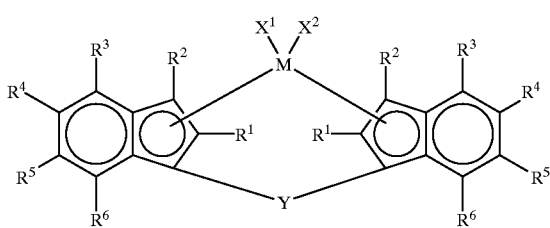

(I)

In the formula (I) above, M is a transition metal atom of the IV group (titanium group) in the periodic table, as exemplified by titanium, zirconium and hafnium. Particularly preferred is zirconium.

$R^1$ is a hydrocarbon group having 1 to 6 carbon atoms, including alkyl groups, such as methyl, ethyl, n-propyl, isopropyl, n-butyl, isobutyl, sec-butyl, tert-butyl, n-pentyl, neopentyl, n-hexyl and cyclohexyl groups; and alkenyl groups, such as vinyl and propenyl groups. Among these, preferred is an alkyl group in which the carbon atom linked to the indenyl group is primary, more preferably an alkyl group having 1 to 4 carbon atoms, most preferably methyl and ethyl groups.

$R^2$, $R^4$, $R^5$ and $R^6$, which may be same or different, are each hydrogen, halogen or hydrocarbon group having 1 to 6 carbon atoms as shown above for $R^1$. The halogen atom includes fluorine, chlorine, bromine and iodine.

When the object copolymer rubber (B) is a branched long chain type, $R^3$ is generally an aryl group having 6 to 16 carbon atoms. The aryl group may be substituted with, for example, one or more substituents selected from halogen atoms as aforementioned, hydrocarbon groups having 1 to 20 carbon atoms and organic silyl groups. The aryl group may include phenyl, α-naphthyl, β-naphthyl, anthracenyl, phenanthryl, pyrenyl, acenaphthyl, phenalenyl, aceanthrylenyl, tetrahydronaphthyl, indanyl and biphenyl groups. Among these, preferred are phenyl, naphthyl, anthracenyl and phenanthryl groups.

The hydrocarbon groups having 1 to 20 carbon atoms as the substituent on the aryl group may include, for example, alkyl groups, such as methyl, ethyl, propyl, butyl, hexyl, cyclohexyl, octyl, nonyl, dodecyl, eicosyl, norbornyl and adamantyl groups; alkenyl groups, such as vinyl, propenyl and cyclohexenyl groups; arylalkyl groups, such as benzyl, phenylethyl and phenylpropyl groups; aryl groups as exemplified for $R^3$; and aryl groups having 6 to 20 carbon atoms, such as tolyl, dimethylphenyl, trimethylphenyl, ethylphenyl, propylphenyl, methylnaphthyl and benzylphenyl groups. The organic silyl groups may include trimethylsilyl, triethylsilyl and triphenylsilyl groups.

Here, $R^3$ is, when the objective copolymer rubber (B) is a straight chain type, usually a hydrogen atom, halogen atom, aliphatic hydrocarbon group of 1 to 20 carbon atoms or halogenated aliphatic hydrocarbon group of 1 to 20 carbon atoms, said halogen atom being fluorine, chlorine, bromine and iodine; said aliphatic hydrocarbon group of 1 to 20 carbon atoms being, for example, alkyl group such as methyl, ethyl, propyl, isopropyl, butyl, hexyl, octyl, nonyl, dodecyl and eicosyl group, vinyl group and alkenyl group such as propenyl group; said halogenated aliphatic hydrocarbon group of 1 to 20 carbon atoms being, for example, halogenated alkyl group such as chloromethyl and trifluoromethyl group.

$X^1$ and $X^2$, which may be same or different, are each hydrogen atom, halogen atom as aforementioned, hydrocarbon group having 1 to 20 carbon atoms which may optionally be substituted with one or more halogen atoms as aforementioned, oxygen-containing group, or sulfur-containing group.

The oxygen-containing group may include hydroxyl group; alkoxy groups having 1 to 20 carbon atoms, such as methoxy, ethoxy, propoxy and butoxy groups; aryloxy groups, such as phenoxy, methylphenoxy, dimethylphenoxy and naphthoxy groups; and aryl-$C_{1-20}$ alkoxy groups, such as phenylmethoxy and phenylethoxy groups.

The sulfur-containing group may include those substituents in which the oxygen atom in the aforementioned oxygen-containing groups is replaced with sulfur atom; sulfonyloxy groups, such as methylsulfonyloxy, trifluoromethanesulfonyloxy, phenylsulfonyloxy, benzylsulfonyloxy, p-toluenesulfonyloxy, trimethylbenzenesulfonyloxy, triisobutylbenzenesulfonyloxy, p-chlorobenzenesulfonyloxy and pentafluorobenzenesulfonyloxy groups; and sulfonyl groups, such as methylsulfonyl, phenylsulfonyl, benzenesulfonyl, p-toluenesulfonyl, trimethylbenzenesulfonyl and pentafluorobenzenesulfonyl groups.

Preferably, $X^1$ and $X^2$ are each halogen atom or hydrocarbon group having 1 to 20 carbon atoms.

Y is a divalent hydrocarbon group having 1 to 20 carbon atoms, a divalent halogenated hydrocarbon group having 1 to 20 carbon atoms, a divalent silicon-containing group, a divalent germanium-containing group, —O—, —CO—, —S—, —SO—, —SO$_2$—, —NR$^7$, —P(R$^7$)—, —P(O)(R$^7$)—, —BR$^7$— or —AlR$^7$— wherein $R^7$ is a hydrogen atom, a halogen atom as aforementioned, a hydrocarbon group having 1 to 20 carbon atoms as aforementioned, or a hydrocarbon group having 1 to 20 carbon atoms and substituted with one or more halogen atoms as aforementioned. Illustratively, it may include divalent hydrocarbon groups having 1 to 20 carbon atoms, including alkylene groups, such as methylene, dimethylmethylene, ethylene, dimethylethylene, trimethylene, tetramethylene, 1,2-cyclohexylene and 1,4-cyclohexylene groups, alkylidene groups, such as cyclohexylidene group, and arylalkylene groups, such as diphenylmethylene and diphenylethylene groups; divalent halogenated hydrocarbon groups having 1 to 20 carbon atoms, such as chloromethylene; divalent silicon-containing groups, including alkylsilylene, alkylarylsilylene and arylsilylene groups, such as methylsilylene, dimethylsilylene, diethylsilylene, di(n-propyl)silylene, di(i-propyl)silylene, di(cyclohexyl)silylene, methylphenylsilylene, diphenylsilylene, di(p-tolyl)silylene and di(p-chlorophenyl)silylene groups, alkyldisilyl, alkylaryldisilyl and aryldisilyl groups, such as tetramethyl-1,2-disilyl and tetraphenyl-1,2-disilyl groups; and divalent germanium-containing groups in which the silicon atom in the divalent silicon-containing groups as aforementioned is replaced with germanium atom.

Preferably, Y is a divalent silicon- or germanium-containing group, more preferably a divalent silicon-containing group, most preferably an alkylsilylene, alkylarylsilylene or arylsilylene group.

Illustrative examples of the metallocene compounds represented by the general formula (I) above are shown below.
rac-dimethylsilylene-bis(2-methyl-4-phenyl-1-indenyl) zirconium dichloride;
rac-dimethylsilylene-bis(2-methyl-4-(α-naphthyl)-1-indenyl)zirconium dichloride;
rac-dimethylsilylene-bis(2-methyl-4-(β-naphthyl)-1-indenyl)zirconium dichloride;
rac-dimethylsilylene-bis(2-methyl-4-(1-anthracenyl)-1-indenyl)zirconium dichloride;

rac-dimethylsilylene-bis(2-methyl-4-(2-anthracenyl)-1-indenyl)zirconium dichloride;
rac-dimethylsilylene-bis(2-methyl-4-(9-anthracenyl)-1-indenyl)zirconium dichloride;
rac-dimethylsilylene-bis(2-methyl-4-(9-phenanthryl)-1-indenyl)zirconium dichloride;
rac-dimethylsilylene-bis(2-methyl-4-(p-fluorophenyl)-1-indenyl)zirconium dichloride;
rac-dimethylsilylene-bis(2-methyl-4-(pentafluorophenyl)-1-indenyl)zirconium dichloride;
rac-dimethylsilylene-bis(2-methyl-4-(p-chlorophenyl)-1-indenyl)zirconium dichloride;
rac-dimethylsilylene-bis(2-methyl-4-(m-chlorophenyl)-1-indenyl)zirconium dichloride;
rac-dimethylsilylene-bis(2-methyl-4-(o-chlorophenyl)-1-indenyl)zirconium dichloride;
rac-dimethylsilylene-bis(2-methyl-4-(2,4-dichlorophenyl)phenyl-1-indenyl)zirconium dichloride;
rac-dimethylsilylene-bis(2-methyl-4-(p-bromophenyl)-1-indenyl)zirconium dichloride;
rac-dimethylsilylene-bis(2-methyl-4-(p-tolyl)-1-indenyl)zirconium dichloride;
rac-dimethylsilylene-bis(2-methyl-4-(m-tolyl)-1-indenyl)zirconium dichloride;
rac-dimethylsilylene-bis(2-methyl-4-(o-tolyl)-1-indenyl)zirconium dichloride;
rac-dimethylsilylene-bis(2-methyl-4-(2,6-dimethylphenyl)-1-indenyl)zirconium dichloride;
rac-dimethylsilylene-bis(2-methyl-4-(p-ethylphenyl)-1-indenyl)zirconium dichloride;
rac-dimethylsilylene-bis(2-methyl-4-(p-isopropylphenyl)-1-indenyl)zirconium dichloride;
rac-dimethylsilylene-bis(2-methyl-4-(p-benzylphenyl)-1-indenyl)zirconium dichloride;
rac-dimethylsilylene-bis(2-methyl-4-(p-biphenylyl)-1-indenyl)zirconium dichloride;
rac-dimethylsilylene-bis(2-methyl-4-(m-biphenylyl)-1-indenyl)zirconium dichloride;
rac-dimethylsilylene-bis(2-methyl-4-(p-trimethylsilylphenyl)-1-indenyl)zirconium dichloride;
rac-dimethylsilylene-bis(2-methyl-4-(m-trimethylsilylphenyl)-1-indenyl)zirconium dichloride;
rac-dimethylsilylene-bis(2-phenyl-4-phenyl-1-indenyl)zirconium dichloride;
rac-diethylsilylene-bis(2-methyl-4-phenyl-1-indenyl)zirconium dichloride;
rac-di-(isopropyl)silylene-bis(2-methyl-4-phenyl-1-indenyl)zirconium dichloride;
rac-di-(n-butyl)silylene-bis(2-methyl-4-phenyl-1-indenyl)zirconium dichloride;
rac-dicyclohexylsilylene-bis(2-methyl-4-phenyl-1-indenyl)zirconium dichloride;
rac-methylphenylsilylene-bis(2-methyl-4-phenyl-1-indenyl)zirconium dichloride;
rac-diphenylsilylene-bis(2-methyl-4-phenyl-1-indenyl)zirconium dichloride;
rac-di(p-tolyl)silylene-bis(2-methyl-4-phenyl-1-indenyl)zirconium dichloride;
rac-di(p-chlorophenyl)silylene-bis(2-methyl-4-phenyl-1-indenyl)zirconium dichloride;
rac-methylene-bis(2-methyl-4-phenyl-1-indenyl)zirconium dichloride;
rac-ethylene-bis(2-methyl-4-phenyl-1-indenyl)zirconium dichloride;
rac-dimethylgermylene-bis(2-methyl-4-phenyl-1-indenyl)zirconium dichloride;
rac-dimethylstannylene-bis(2-methyl-4-phenyl-1-indenyl)zirconium dichloride;
rac-dimethylsilylene-bis(2-methyl-4-phenyl-1-indenyl)zirconium dibromide;
rac-dimethylsilylene-bis(2-methyl-4-phenyl-1-indenyl)zirconium dimethyl;
rac-dimethylsilylene-bis(2-methyl-4-phenyl-1-indenyl)zirconium methyl chloride;
rac-dimethylsilylene-bis(2-methyl-4-phenyl-1-indenyl)zirconium chloride $SO_2Me$;
rac-dimethylsilylene-bis(2-methyl-4-phenyl-1-indenyl)zirconium chloride $OSO_2Me$;
rac-dimethylsilylene-bis(2-ethyl-4-phenyl-1-indenyl)zirconium dichloride;
rac-dimethylsilylene-bis(2-ethyl-4-(α-naphthyl)-1-indenyl)zirconium dichloride;
rac-dimethylsilylene-bis(2-ethyl-4-(β-naphthyl)-1-indenyl)zirconium dichloride;
rac-dimethylsilylene-bis(2-ethyl-4-(2-methyl-1-naphthyl)-1-indenyl)zirconium dichloride;
rac-dimethylsilylene-bis(2-ethyl-4-(5-acenaphthyl)-1-indenyl)zirconium dichloride;
rac-dimethylsilylene-bis(2-ethyl-4-(9-anthracenyl)-1-indenyl)zirconium dichloride;
rac-dimethylsilylene-bis(2-ethyl-4-(9-phenanthryl)-1-indenyl)zirconium dichloride;
rac-dimethylsilylene-bis(2-ethyl-4-(o-methylphenyl)-1-indenyl)zirconium dichloride;
rac-dimethylsilylene-bis(2-ethyl-4-(m-methylphenyl)-1-indenyl)zirconium dichloride;
rac-dimethylsilylene-bis(2-ethyl-4-(p-methylphenyl)-1-indenyl)zirconium dichloride;
rac-dimethylsilylene-bis(2-ethyl-4-(2,3-dimethylphenyl)-1-indenyl)zirconium dichloride;
rac-dimethylsilylene-bis(2-ethyl-4-(2,4-dimethylphenyl)-1-indenyl)zirconium dichloride;
rac-dimethylsilylene-bis(2-ethyl-4-(2,5-dimethylphenyl)-1-indenyl)zirconium dichloride;
rac-dimethylsilylene-bis(2-ethyl-4-(2,4,6-trimethylphenyl)-1-indenyl)zirconium dichloride;
rac-dimethylsilylene-bis(2-ethyl-4-(o-chlorophenyl)-1-indenyl)zirconium dichloride;
rac-dimethylsilylene-bis(2-ethyl-4-(m-chlorophenyl)-1-indenyl)zirconium dichloride;
rac-dimethylsilylene-bis(2-ethyl-4-(p-chlorophenyl)-1-indenyl)zirconium dichloride;
rac-dimethylsilylene-bis(2-ethyl-4-(2,3-dichlorophenyl)-1-indenyl)zirconium dichloride;
rac-dimethylsilylene-bis(2-ethyl-4-(2,6-dichlorophenyl)-1-indenyl)zirconium dichloride;
rac-dimethylsilylene-bis(2-ethyl-4-(3,5-dichlorophenyl)-1-indenyl)zirconium dichloride;
rac-dimethylsilylene-bis(2-ethyl-4-(2-bromophenyl)-1-indenyl)zirconium dichloride;
rac-dimethylsilylene-bis(2-ethyl-4-(3-bromophenyl)-1-indenyl)zirconium dichloride;
rac-dimethylsilylene-bis(2-ethyl-4-(4-bromophenyl)-1-indenyl)zirconium dichloride;
rac-dimethylsilylene-bis(2-ethyl-4-(4-biphenylyl)-1-indenyl)zirconium dichloride;
rac-dimethylsilylene-bis(2-ethyl-4-(4-trimethylsilylphenyl)-1-indenyl)zirconium dichloride;
rac-dimethylsilylene-bis(2-n-propyl-4-phenyl-1-indenyl)zirconium dichloride;
rac-dimethylsilylene-bis(2-n-propyl-4-(α-naphthyl)-1-indenyl)zirconium dichloride;
rac-dimethylsilylene-bis(2-n-propyl-4-(β-naphthyl)-1-indenyl)zirconium dichloride;
rac-dimethylsilylene-bis(2-n-propyl-4-(2-methyl-1-naphthyl)-1-indenyl)zirconium dichloride;

rac-dimethylsilylene-bis(2-n-propyl-4-(5-acenaphthyl)-1-indenyl)zirconium dichloride;
rac-dimethylsilylene-bis(2-n-propyl-4-(9-anthracenyl)-1-indenyl)zirconium dichloride;
rac-dimethylsilylene-bis(2-n-propyl-4-(9-phenanthryl)-1-indenyl)zirconium dichloride;
rac-dimethylsilylene-bis(2-isopropyl-4-phenyl-1-indenyl)zirconium dichloride;
rac-dimethylsilylene-bis(2-isopropyl-4-(α-naphthyl)-1-indenyl)zirconium dichloride;
rac-dimethylsilylene-bis(2-isopropyl-4-(β-naphthyl)-1-indenyl)zirconium dichloride;
rac-dimethylsilylene-bis(2-isopropyl-4-(8-methyl-9-naphthyl)-1-indenyl)zirconium dichloride;
rac-dimethylsilylene-bis(2-isopropyl-4-(5-acenaphthyl)-1-indenyl)zirconium dichloride;
rac-dimethylsilylene-bis(2-isopropyl-4-(9-anthracenyl)-1-indenyl)zirconium dichloride;
rac-dimethylsilylene-bis(2-isopropyl-4-(9-phenanthryl)-1-indenyl)zirconium dichloride;
rac-dimethylsilylene-bis(2-s-butyl-4-phenyl-1-indenyl)zirconium dichloride;
rac-dimethylsilylene-bis(2-s-butyl-4-(α-naphthyl)-1-indenyl)zirconium dichloride;
rac-dimethylsilylene-bis(2-s-butyl-4-(β-naphthyl)-1-indenyl)zirconium dichloride;
rac-dimethylsilylene-bis(2-s-butyl-4-(2-methyl-1-naphthyl)-1-indenyl)zirconium dichloride;
rac-dimethylsilylene-bis(2-s-butyl-4-(5-acenaphthyl)-1-indenyl)zirconium dichloride;
rac-dimethylsilylene-bis(2-s-butyl-4-(9-anthracenyl)-1-indenyl)zirconium dichloride;
rac-dimethylsilylene-bis(2-s-butyl-4-(9-phenanthryl)-1-indenyl)zirconium dichloride;
rac-dimethylsilylene-bis(2-n-pentyl-4-phenyl-1-indenyl)zirconium dichloride;
rac-dimethylsilylene-bis(2-n-pentyl-4-(α-naphthyl)-1-indenyl)zirconium dichloride;
rac-dimethylsilylene-bis(2-n-butyl-4-phenyl-1-indenyl)zirconium dichloride;
rac-dimethylsilylene-bis(2-n-butyl-4-(α-naphthyl)-1-indenyl)zirconium dichloride;
rac-dimethylsilylene-bis(2-n-butyl-4-(β-naphthyl)-1-indenyl)zirconium dichloride;
rac-dimethylsilylene-bis(2-n-butyl-4-(2-methyl-1-naphthyl)-1-indenyl)zirconium dichloride;
rac-dimethylsilylene-bis(2-n-butyl-4-(5-acenaphthyl)-1-indenyl)zirconium dichloride;
rac-dimethylsilylene-bis(2-n-butyl-4-(9-anthracenyl)-1-indenyl)zirconium dichloride;
rac-dimethylsilylene-bis(2-n-butyl-4-(9-phenanthryl)-1-indenyl)zirconium dichloride;
rac-dimethylsilylene-bis(2-isobutyl-4-phenyl-1-indenyl)zirconium dichloride;
rac-dimethylsilylene-bis(2-isobutyl-4-(α-naphthyl)-1-indenyl)zirconium dichloride;
rac-dimethylsilylene-bis(2-isobutyl-4-(β-naphthyl)-1-indenyl)zirconium dichloride;
rac-dimethylsilylene-bis(2-isobutyl-4-(2-methyl-1-naphthyl)-1-indenyl)zirconium dichloride;
rac-dimethylsilylene-bis(2-isobutyl-4-(5-acenaphthyl)-1-indenyl)zirconium dichloride;
rac-dimethylsilylene-bis(2-isobutyl-4-(9-anthracenyl)-1-indenyl)zirconium dichloride;
rac-dimethylsilylene-bis(2-isobutyl-4-(9-phenanthryl)-1-indenyl)zirconium dichloride;
rac-dimethylsilylene-bis(2-neopentyl-4-phenyl-1-indenyl)zirconium dichloride;
rac-dimethylsilylene-bis(2-neopentyl-4-(α-naphthyl)-1-indenyl)zirconium dichloride;
rac-dimethylsilylene-bis(2-n-hexyl-4-phenyl-1-indenyl)zirconium dichloride;
rac-dimethylsilylene-bis(2-n-hexyl-4-α-naphthyl)-1-indenyl)zirconium dichloride;
rac-methylphenylsilylene-bis(2-ethyl-4-phenyl-1-indenyl)zirconium dichloride;
rac-methylphenylsilylene-bis(2-ethyl-4-α-naphthyl)-1-indenyl)zirconium dichloride;
rac-methylphenylsilylene-bis(2-ethyl-4-(9-anthracenyl)-1-indenyl)zirconium dichloride;
rac-methylphenylsilylene-bis(2-ethyl-4-(9-phenanthryl)-1-indenyl)zirconium dichloride;
rac-diphenylsilylene-bis(2-ethyl-4-phenyl-1-indenyl)zirconium dichloride;
rac-diphenylsilylene-bis(2-ethyl-4-(α-naphthyl)-1-indenyl)zirconium dichloride;
rac-diphenylsilylene-bis(2-ethyl-4-(9-anthracenyl)-1-indenyl)zirconium dichloride;
rac-diphenylsilylene-bis(2-ethyl-4-(9-phenanthryl)-1-indenyl)zirconium dichloride;
rac-diphenylsilylene-bis(2-ethyl-4-(4-biphenylyl)-1-indenyl)zirconium dichloride;
rac-methylene-bis(2-ethyl-4-phenyl-1-indenyl)zirconium dichloride;
rac-methylene-bis(2-ethyl-4-(α-naphthyl)-1-indenyl)zirconium dichloride;
rac-ethylene-bis(2-ethyl-4-phenyl-1-indenyl)zirconium dichloride;
rac-ethylene-bis(2-ethyl-4-(α-naphthyl)-1-indenyl)zirconium dichloride;
rac-ethylene-bis(2-n-propyl-4-(α-naphthyl)-1-indenyl)zirconium dichloride;
rac-dimethylgermyl-bis(2-ethyl-4-phenyl-1-indenyl)zirconium dichloride;
rac-dimethylgermyl-bis(2-ethyl-4-(α-naphthyl)-1-indenyl)zirconium dichloride;
rac-dimethylgermyl-bis(2-n-propyl-4-phenyl-1-indenyl)zirconium dichloride; etc.

Also included are compounds in which the zirconium atom in the aforementioned compounds is replaced with titanium or hafnium.

In the present invention, racemic modifications of the aforementioned metallocene compounds are generally used as the catalytic component. However, R or S modifications thereof may be also used.

In the present invention, the aforementioned metallocene compounds may be in any combinations of two or more thereof.

The metallocene compounds may be prepared according to the method described in Journal of Organometallic Chem. 288 (1985), p. 63-67; and EP-A-0,320,762.

The aforementioned metallocene compound [A] includes the metallocene compound shown by the following general formula (II) which is described in JP-A-3-163088 as well as the compound shown by the foregoing general formula (I), $$L^a MX_2 \qquad (II)$$

wherein M is a metal of IV-group of the periodic table (titanium group) or lanthanide homologue, $L^a$ is a portion containing nonlocalized π bond and provides binding geometric shape on the active site of metal M, and X is each independently a hydrogen atom, halogen atom, silicon atom, hydrocarbon group of 1 to 20 carbon atoms which may contain germanium atom, silyl group or germyl group.

Of the compounds shown in the formula (II), preferred are the compounds shown concretely in the following formula (III),

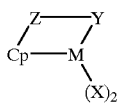
(III)

wherein, M is titanium, zirconium or hafnium, X is the same as the above-mentioned, Cp binds with M with π bond and in addition is a substituted cyclopentadienyl group having substituent Z or a derivative thereof, Z is oxygen, sulfur, boron or a portion containing an element of XIV-group of the periodic table (carbon homologue), Y is a ligand containing nitrogen, phosphorus, sulfur, and Z and Y may form a condensation ring.

Concretely, the compounds denoted by the formula (III) include the following:
(Dimethyl(t-butylamide) (tetramethyl-$\eta^5$-cyclopentadienyl) silane)titanium dichloride
((t-Butylamide)(tetramethyl-$\eta^5$-cyclopentadienyl)-1,2-ethanediyl) titanium dichloride,
(Dibenzyl(t-butylamide)(tetramethyl-$\eta^5$-cyclopentadienyl) silane)titanium dichloride,
(Dimethyl(t-butylamide)(tetramethyl-$\eta^5$-cyclopentadienyl) silane)dibenzyltitanium,
(Dimethyl(t-butylamide)(tetramethyl-$\eta^5$-cyclopentadienyl) silane)dimethyltitanium,
((t-Butylamide)(tetramethyl-$\eta^5$-cyclopentadienyl)-1,2-ethanediyl)dibenzyltitanium,
((Methylamide)(tetramethyl-$\eta^5$-cyclopentadienyl)-1,2-ethanediyl)dineopentyltitanium,
((Phenylphosphide)(tetramethyl-$\eta^5$-cyclopentadienyl) methylene)diphenyltitanium,
(Dibenzyl(t-butylamide)(tetramethyl-$\eta^5$-cyclopentadienyl) silane)dibenzyltitanium,
(Dimethyl(benzylamide)($\eta^5$-cyclopentadienyl)silane)di (trimethylsilyl)titanium,
(Dimethyl(phenylphosphide)-(tetramethyl-$\eta^5$-cyclopentadienyl)silane)dibenzyltitanium,
((Tetramethyl-$\eta^5$-cyclopentadienyl)-1,2-ethanediyl) dibenzyltitanium,
(2-$\eta^5$-(tetramethyl-cyclopentadienyl)-1-methyl-ethanolate (2-))dibenzyltitanium,
(2-$\eta^5$-(tetramethyl-cyclopentadienyl)-1-methyl-ethanolate (2-))dimethyltitanium,
(2-((4a,4b,8a,9,9a-$\eta$))-9H-fluorene-9-yl)cyclohexanolate (2-))dimethyltitanium,
(2-((4a,4b,8a,9,9a-$\eta$)-9H-fluorene-9-yl)cyclohexanolate (2-)) dibenzyltitanium.

In the present invention the metallocene compounds denoted by the formula (II) can be used in a combination of two or more.

In the above-mentioned explanation, the titanium compounds were illustrated as the metallocene compounds, but the compounds can be illustrated which replaces titanium with zirconium or hafnium.

These compounds can be used singly or in a combination of two or more.

In the preparation of the branched long chain ethylene-α-olefin-non-conjugated polyene copolymer rubber (B), among the metallocene compounds mentioned above, those shown by the above general formula (I) are preferably used.

The organic aluminum oxy compounds [B] used to prepare the metallocene catalysts may be any of conventionally known aluminoxanes or benzene insoluble organic aluminum oxy compounds disclosed in JP-A-2-78687.

Conventionally known aluminoxanes may be prepared, for example, by the following method:

(1) An organic aluminum compound, such as a trialkylaluminum, is added to a suspension of a compound containing absorbed water or a salt containing water of crystallization, such as magnesium chloride hydrate, copper sulfate hydrate, aluminum sulfate hydrate, nickel sulfate hydrate or cerous chloride hydrate, in a hydrocarbon medium to react followed by recovery of a hydrocarbon solution;

(2) Water, ice or water vapor is directly acted on an organic aluminum compound, such as a trialkylaluminum, in a medium, such as benzene, toluene, ethyl ether or tetrahydrofuran, followed by recovery of a hydrocarbon solution; or (3) An organic tin oxide, such as dimethyl tin oxide or dibutyl tin oxide, is reacted with an organic aluminum compound, such as a trialkylaluminum, in a medium, such as decane, benzene or toluene.

The alminoxane may contain a small amount of organic metallic component(s). The solvent or unreacted organic aluminum compound may be distilled out of the recovered aluminoxane solution followed by re-dissolution in a solvent.

The organic aluminum compound used to prepare the aluminoxane may include trialkylaluminum, such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum or tridecylaluminum; tricycloalkylaluminum, such as tricyclohexylaluminum or tricyclooctylaluminum; dialkylaluminum halide, such as dimethylaluminum chloride, diethylaluminum chloride, diethylaluminum bromide or diisobutylaluminum chloride; dialkylaluminum hydride, such as diethylaluminum hydride or diisobutylaluminum hydride; dialkylaluminum alkoxide, such as dimethylaluminum methoxide or diethylaluminum ethoxide; and dialkylaluminum aryloxide, such as diethylaluminum phenoxide. Among these, trialkylaluminum and tricycloalkylaluminum are particularly preferred.

The organic aluminum compound used to prepare the aluminoxane may also include an isoprenyl aluminum represented by the formula:

wherein x, y and z are positive numbers, provided that $z \geq 2x$.

These organic aluminum compounds may be used in any combinations of two or more thereof.

The solvent used in the preparation of the aluminoxane may include, for example, hydrocarbon solvents including aromatic hydrocarbons, such as benzene, toluene, xylene, cumene and cymene; aliphatic hydrocarbons, such as pentane, hexane, heptane, octane, decane, dodecane, hexadecane and octadecane; alicyclic hydrocarbons, such as cyclopentane, cyclohexane, cyclooctane and methylcyclopentane; petroleum fractions, such as gasoline, kerosene and gas oil; and halogenated, particularly chlorinated or brominated, hydrocarbon solvents, such as halogenated products of the aforementioned aromatic, aliphatic and alicyclic hydrocarbons. Further, ethers such as ethyl ether and tetrahydrofuran may also be used. Among these solvents, aromatic hydrocarbons are particularly preferred.

The compounds [C] capable of reacting with the aforementioned metallocene compound [A] to form an ion pair may include Lewis acids, ionic compounds, borane compounds and carborane compounds described in JP-A-1-501950, JP-A-1-502036, JP-A-3-179005, JP-A-3-179006, JP-A-3-207703 and JP-A-3-207704 and U.S. Pat. No. 5,321,106.

The Lewis acids may include magnesium-, aluminum- or boron-containing Lewis acids with boron-containing Lewis acids being preferred. Illustrative examples of the boron-containing Lewis acids are compounds represented by the following general formula:

$$BR^8R^9R^{10}$$

wherein $R^8$, $R^9$ and $R^{10}$ independently represent fluorine atom, or phenyl group optionally substituted with a substituent or substituents, such as fluorine atom, methyl or trifluoromethyl group.

Examples of the boron-containing Lewis acids represented by the general formula above may include trifluoroboron, triphenylboron, tris(4-fluorophenyl)boron, tris(3,5-difluorophenyl)boron, tris(4-fluoromethylphenyl) boron, tris(pentafluorophenyl)boron, tris(p-tolyl)boron, tris (o-tolyl)boron, and tris(3,5-dimethylphenyl)boron. Among these, tris(pentafluorophenyl)boron is particularly preferred.

The ionic compounds are salts composed of cationic and anionic compounds. The anion can stabilize transition metallic cation species by reacting with the metallocene compound [A] to cationize the metallocene compound [A] thereby forming an ion pair. Such anions may include organic boron, arsenic and aluminum compound anions. Preferred anions are those which are relatively bulky and stabilize the transition metal cationic species. The cations may include metallic, organic metallic, carbonium, tripium, oxonium, sulfonium, phosphonium, and ammonium cations. Illustrative examples thereof may include triphenylcarbenium, tributylammonium, N,N-dimethylammonium and ferrocenium cations.

Preferred ionic compounds may be those having organic boron compound anions. Illustrative examples thereof include trialkyl-substituted ammonium salts, such as triethylammonium tetra(phenyl)boron, tripropylammonium tetra (phenyl)boron, tri(n-butyl)ammonium tetra(phenyl)boron, trimethylammonium tetra(p-tolyl)boron, trimethylammonium tetra(o-tolyl)boron, tributylammonium tetra (pentafluorophenyl)boron, tripropylammonium tetra(2,4-dimethylphenyl)boron, tributylammonium tetra(3,5-dimethylphenyl)boron, tributylammonium tetra(p-trifluoromethylphenyl)boron, tri(n-butyl)ammonium tetra (o-tolyl)boron, and tri(n-butyl)ammonium tetra(4-fluorophenyl)boron; N,N-dialkylanilinium salts, such as N,N-dimethylanilinium tetra(phenyl)boron, N,N-diethylanilinium tetra(phenyl)boron, and N,N-2,4,6-pentamethylanilinium tetra(phenyl)boron; dialkylammonium salts, such as di(n-propyl)ammonium tetra (pentafluorophenyl)boron, and dicyclohexylammonium tetra(phenyl)boron; and triarylphosphonium salts, such as triphenylphosphonium tetra(phenyl)boron, tri (methylphenyl)phosphonium tetra(phenyl)boron, and tri (dimethylphenyl)phosphonium tetra(phenyl)boron.

Also included in the boron atom-containing ionic compounds are triphenylcarbenium tetrakis(pentafluorophenyl) borate, N,N-dimethylanilinium tetrakis(pentafluorophenyl) borate, and ferrocenium tetra(pentafluorophenyl)borate.

The following ionic compounds containing boron atom may also be exemplified (in the following ionic compounds, the counterion is tri(n-butyl)ammonium but not limited thereto):

Salts of anions, for example, bis[tri(n-butyl)ammonium] nonaborate, bis[tri(n-butyl)ammonium]decaborate, bis[tri (n-butyl)ammonium] undecaborate, bis[tri(n-butyl) ammonium] dodecaborate, bis[tri(n-butyl)ammonium] decachloroborate, bis[tri(n-butyl)ammonium] dodecachlorododecaborate, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammonium bromo-1-carbadodecaborate. Further, the following borane and carborane compounds may be encompassed. These compounds are used as Lewis acids and ionic compounds.

Examples of the borane compounds, carborane complex compounds and salts of carborane anions include, for example, decaborane (14), 7,8-dicarbaundecaborane (13), 2,7-dicarbaundecaborane (13), undecahydride-7,8-dimethyl-7,8-dicarbaundecaborane, dodecahydride-11-methyl-2,7-dicarbaundecaborane, tri(n-butyl)ammonium 6-carbadecaborate (14), tri(n-butyl)ammonium 6-carbadecaborate (12), tri(n-butyl)ammonium 7-carbaundecaborate (13), tri(n-butyl)ammonium 7,8-dicarbaundecaborate (12), tri(n-butyl)ammonium 2,9-dicarbaundecaborate (12), tri(n-butyl)ammonium dodecahydride-8-methyl 7,9-dicarbaundecaborate, tri(n-butyl)ammonium undecahydride 8-ethyl-7,9-dicarbaundecaborate, tri(n-butyl)ammonium undecahydride-8-butyl-7,9-dicarbaundecaborate, tri(n-butyl)ammonium undecahydride-8-allyl-7,9-dicarbaundecaborate, tri(n-butyl)ammonium undecahydride-9-trimethylsilyl-7,8-dicarbaundecaborate, tri (n-butyl)ammonium undecahydride-4,6-dibromo-7-carbaundecaborate.

Examples of the carborane compounds and salts of carboranes may include, for example, 4-carbanonaborane (14), 1,3-dicarbanonaborane (13), 6,9-dicarbadecaborane (14), dodecahydride-1-phenyl-1,3-dicarbanonaborane, dodecahydride-1-methyl-1,3-dicarbanonaborane, undecahydride-1,3-dimethyl-1,3-dicarbanonaborane.

Further, the following compounds may be exemplified (in the following ionic compounds, the counterion is tri(n-butyl) ammonium but not limited thereto):

Salts of metallic carboranes and metallic borane anions, such as, for example, tri(n-butyl)ammonium bis (nonahydride-1,3-dicarbanonaborate)cobaltate (III), tri(n-butyl)ammonium bis(undecahydride-7,8-dicarbaundecaborate)ferrate (III), tri(n-butyl)ammonium bis (undecahydride-7,8-dicarbaundecaborate)cobaltate (III), tri (n-butyl)ammonium bis(undecahydride-7,8-dicarbaundecaborate)nickelate (III), tri(n-butyl)ammonium bis(undecahydride-7,8-dicarbaundecaborate)cuprate (III), tri(n-butyl)ammonium bis(undecahydride-7,8-dicarbaundecaborate)aurate (III), tri(n-butyl)ammonium bis (nonahydride-7,8-dimethyl-7,8-dicarbaundecaborate)ferrate (III), tri(n-butyl)ammonium bis(nonahydride-7,8-dimethyl-7,8-dicarbaundecaborate)chromate (III), tri(n-butyl) ammonium bis(tribromooctahydride-7,8-dicarbaundecaborate)cobaltate (III), tri(n-butyl)ammonium bis(dodecahydride dicarbadodecaborate)cobaltate (III), bis [tri(n-butyl)ammonium] bis(dodecahydride dodecaborate) nickelate (III), tris[tri(n-butyl)ammonium] bis (undecahydride-7-carbaundecaborate)chromate (III), bis[tri (n-butyl)ammonium] bis(undecahydride-7-carbaundecaborate)manganate (IV), bis[tri(n-butyl) ammonium] bis(undecahydride-7-carbaundecaborate) cobaltate (III), bis[tri(n-butyl)ammonium] bis (undecahydride-7-carbaundecaborate)nickelate (IV).

These compounds [C] may be in any combinations of two or more thereof.

The organic aluminum compounds [D] used in the present invention may be represented by, for example, the following general formula (a):

$$R^{11}{}_n AlX_{3-n} \quad (a)$$

wherein $R^{11}$ is a hydrocarbon group having 1 to 12 carbon atoms, X is a halogen or hydrogen atom, and n is 1 to 3.

In the formula (a) above, $R^{11}$ is a hydrocarbon group, such as alkyl, cycloalkyl or aryl group, having 1 to 12 carbon atoms and includes methyl, ethyl, n-propyl, isopropyl, isobutyl, pentyl, hexyl, octyl, cyclopentyl, cyclohexyl, phenyl and tolyl groups.

Illustrative examples of such organic aluminum compounds may include trialkylaluminum, such as trimethylaluminum, triethylaluminum, triisopropylaluminum, triisobutylaluminum, trioctylaluminum, tri-2-ethylhexylaluminum; alkenylaluminum, such as isoprenylaluminum; dialkylaluminum halides, such as dimethylaluminum chloride, diethylaluminum chloride, diisopropylaluminum chloride, diisobutylaluminum chloride, dimethylaluminum bromide; alkylaluminum sesquihalides, such as methylaluminum sesquichloride, ethylaluminum sesquichloride, isopropylaluminum sesquichloride, butylaluminum sesquichloride, ethylaluminum sesquibromide; alkylaluminum dihalides, such as methylaluminum dichloride, ethylaluminum dichloride, isopropylaluminum dichloride, ethylaluminum dibromide; and alkylaluminum hydrides, such as diethylaluminum hydride, diisobutylaluminum hydride.

As the organic aluminum compounds [D], those compounds represented by the following formula (b):

$$R^{11}{}_n AlY_{3-n} \quad (b)$$

wherein $R^{11}$ is as defined for $R^{11}$ in the formula (a) above, Y is $-OR^{12}$, $-OSiR^{13}{}_3$, $-OAlR^{14}{}_2$, $-NR^{15}{}_2$, $-SiR^{16}{}_3$ or $-N(R^{17})AlR^{18}{}_2$ group, n is 1 to 2, $R^{12}$, $R^{13}$, $R^{14}$ and $R^{18}$ are methyl, ethyl, isopropyl, isobutyl, cyclohexyl, phenyl or the like groups, $R^{15}$ is hydrogen atom, methyl, ethyl, isopropyl, phenyl, trimethylsilyl or the like group, $R^{16}$ and $R^{17}$ are methyl, ethyl or the like groups, may also be used.

Such organic aluminum compounds may include the following compounds:

(i) Compounds represented by $R^{11}{}_n Al(OR^{12})_{3-n}$, including dimethylaluminum methoxide, diethylaluminum ethoxide, diisobutylaluminum methoxide, etc.;

(ii) Compounds represented by $R^{11}{}_n Al(OSiR^{13}{}_3)_{3-n}$, including $(C_2H_5)_2Al(OSi(CH_3)_3)$, $(iso-C_4H_9)_2Al(OSi(CH_3)_3)$, $(iso-C_4H_9)_2Al(OSi(C_2H_5)_3)$, etc.;

(iii) Compounds represented by $R^{11}{}_n Al(OAlR^{14}{}_2)_{3-n}$, including $(C_2H_5)_2Al(OAl(C_2H_5)_2)$, $(iso-C_4H_9)_2Al(OAl(iso-C_4H_9)_2)$, etc.;

(iv) Compounds represented by $R^{11}{}_n Al(NR^{15}{}_2)_{3-n}$, including $(CH_3)_2Al(N(C_2H_5)_2)$, $(C_2H_5)_2Al(NH(CH_3))$, $(CH_3)_2Al(NH(C_2H_5))$, $(C_2H_5)_2Al[N(Si(CH_3)_3)_2]$, $(iso-C_4H_9)_2Al[N(Si(CH_3)_3)_2]$, etc.; and (v) Compounds represented by $R^{11}{}_n Al(SiR^{16}{}_3)_{3-n}$, including $(iso-C_4H_9)_2Al(Si(CH_3)_3)$, etc.

Preferred examples may include the organic aluminum compounds represented by $R^{11}{}_3Al$, $R^{11}{}_n Al(OR^{12})_{3-n}$, and $R^{11}{}_n Al(OAlR^{14}{}_2)_{3-n}$. Those compounds wherein $R^{11}$ is an isoalkyl group and n=2 are particularly preferred. These organic aluminum compounds may be used in any combinations of two or more thereof.

The metallocene catalyst used in the present invention contains a metallocene compound [A] as aforementioned. For example, it may be formed from the metallocene compound [A] and the organic aluminum oxy compound [B], as aforementioned. It may also be formed from the metallocene compound [A] and the compound [C] capable of reacting with the metallocene compound [A] to form an ion pair. Further, it may contain the metallocene compound [A], the organic aluminum oxy compound [B], and the compound [C] capable of reacting with the metallocene compound [A] to form an ion pair. In these embodiments, it is particularly preferred to further use the organic aluminum compound [D].

In the present invention, the metallocene compound [A] is generally used in an amount of about 0.00005 to 0.1 mmoles, preferably about 0.0001 to 0.05 mmoles as reduced to the transition metal atom per liter of the polymerization volume.

The organic aluminum oxy compound [B] may be generally used in an amount of about 1 to 10,000 moles, preferably 10 to 5,000 moles of aluminum atom per mole of the transition metal atom.

The compound [C] capable of reacting with the metallocene compound [A] to form an ion pair is generally used in an amount of about 0.5 to 20 moles, preferably 1 to 10 moles of boron atom per mole of the transition metal atom.

Further, the organic aluminum compound [D] may be optionally used in an amount of about 0 to 1,000 moles, preferably about 0 to 500 moles per mole of aluminum atom in the organic aluminum oxy compound [B] or boron atom in the compound [C] forming an ion pair.

Copolymerization of ethylene, an α-olefin having 3 to 20 carbon atoms and a non-conjugated polyene using such a metallocene catalyst as aforementioned may provide the straight chain or branched long chain ethylene-α-olefin-non-conjugated polyene copolymer rubber (B) with an excellent polymerization activity.

The catalyst for the manufacture of the copolymer rubber (B) is not limited to the aforementioned metallocene catalyst, and there can be used other metallocene catalysts, V-group transition metal compound catalysts such as vanadium catalyst, and titanium non-metallocene catalysts.

The vanadium catalyst includes for example the catalyst described in JP-A-64(1989)-54010, concretely, $VOCl_2(OC_2H_5)$ and $VOCl_3$, and there can be used combinations of these and organic aluminum compounds such as dialkylaluminum halide (e.g., diethylaluminum chloride). The titanium non-metallocene catalysts include the catalysts described for example in JP-A-2-84404.

Further, even if ethylene, an α-olefin having 3 to 20 carbon atoms and a non-conjugated polyene are copolymerized using a V-group transition metal compound catalyst such as vanadium catalyst, it is not possible to obtain a copolymer rubber with sufficient polymerization activity.

Furthermore, upon manufacturing, for example, an ethylene-1-butene-non-conjugated polyene copolymer rubber and ethylene-propylene-diene copolymer rubber (EPDM) using a V-group transition metal compound catalyst, the kind of non-conjugated polyene is mostly limited to norbornene ring-containing polyenes such as 5-ethylidene-2-norbornene (ENB).

On the other hand, if a metallocene catalyst is used, the non-conjugated polyene is not limited to norbornene ring-containing polyenes, and various polyenes, for example, linear non-conjugated polyenes such as methyloctadiene (MOD), e.g., 7-methyl-1,6-octadiene can be copolymerized.

In the present invention, when ethylene, an α-olefin having 3 to 20 carbon atoms and a non-conjugated polyene are copolymerized, the metallocene compound [A], organic aluminum oxy compound [B], compound [C] forming an ion pair, and optionally organic aluminum compound [D], which constitute the metallocene catalyst, may be separately supplied to a polymerization reaction vessel. Alternatively, the metallocene catalyst comprising the metallocene compound [A] may be preliminarily prepared and then subjected to the copolymerization reaction.

To prepare the metallocene catalyst, a solvent reactively inert with the catalyst components can be used. Such an inert solvent used may include aliphatic hydrocarbons, such as propane, butane, pentane, hexane, heptane, octane, decane, dodecane and kerocene; alicyclic hydrocarbons, such as cyclopentane, cyclohexane and methylcyclopentane; aromatic hydrocarbons, such as benzene, toluene and xylene; and halogenated hydrocarbons, such as ethylene chloride, chlorobenzene and dichloromethane. These solvents may be used alone or in any combination thereof.

Generally, the metallocene compound [A], organic aluminum oxy compound [B], compound [C] forming an ion pair, and organic aluminum compound [D] may be mixed and contacted at $-100$ to $200°$ C., preferably $-70$ to $100°$ C.

Generally, the copolymerization of ethylene, an $\alpha$-olefin having 3 to 20 carbon atoms and a non-conjugated polyene may be carried out at 40 to $200°$ C., preferably 50 to $150°$ C., particularly 60 to $120°$ C., and atmospheric pressure to 100 kg/cm$^2$, preferably atmospheric pressure to 50 kg/cm$^2$, particularly atmospheric pressure to 30 kg/cm$^2$.

The copolymerization reaction may be carried out by a variety of polymerization methods, preferably by solution polymerization wherein the aforementioned solvent may be used as the polymerization solvent.

The copolymerization may be carried out in a batch, semi-continuous or continuous mode, preferably in a continuous mode. Further, The copolymerization may be carried out in two or more steps with different polymerization conditions from each other.

The ethylene-$\alpha$-olefin-non-conjugated polyene copolymer rubber (B) used in the present invention is obtained by the aforementioned method wherein the molecular weight of the copolymer rubber (B) may be controlled by changing the polymerization conditions, such as polymerization temperature, and also by controlling the amount of hydrogen used as a molecular weight controlling agent.

In the olefinic thermoplastic elastomer composition of the present invention, the ethylene-$\alpha$-olefin-non-conjugated polyene copolymer rubber (B) is used in a ratio of 88 to 38 wt. parts, preferably 80 to 45 wt. parts to the total 100 wt. parts of a crystalline polyolefin resin (A), an ethylene-$\alpha$-olefin-non-conjugated polyene copolymer rubber (B) and at least one rubber (C) selected from polyisobutylene, butyl rubber and a propylene-ethylene copolymer rubber having a propylene content of 50 mol % or more or an ethylene-$\alpha$-olefin copolymer (D) having a density of 0.870 to 0.940 (g/cm$^3$) and having an ethylene content of 85 mol % or more.

In the method for manufacturing the olefinic thermoplastic elastomer composition of the present invention, the ethylene-$\alpha$-olefin-non-conjugated polyene copolymer rubber (B) is used in a ratio of 90 to 40 wt. parts, preferably 80 to 45 wt. parts to the total 100 wt. parts of a crystalline polyolefin resin (A) and an ethylene-$\alpha$-olefin-non-conjugated polyene copolymer rubber (B).

Other Rubber Component (C)

The olefinic thermoplastic elastomer composition of the present invention contains at least one rubber (C) selected from widely known polyisobutylene, butyl rubber and a propylene-ethylene copolymer rubber having a propylene content of 50 mol % or more. The MFR of the other rubber component (C) used in the present invention is in the range of 10 or less, preferably 5 or less, more preferably 3 or less (g/10 min.). The other rubber component (C) of the present invention is used in a proportion of 2 to 30 wt. parts to the total 100 wt. parts of a crystalline polyolefin resin (A), ethylene-$\alpha$-olefin-non-conjugated polyene copolymer rubber (B) and at least one rubber (C) selected from polyisobutylene, butyl rubber and propylene-ethylene copolymer rubber having a propylene content of 50 mol % or more.

Ethylene-$\alpha$-olefin Copolymer (D)

The ethylene-$\alpha$-olefin copolymer (D) used in the present invention is a copolymer of 85 or more, preferably 88 to 99, more preferably 90 to 98 mol % ethylene with an $\alpha$-olefin. The $\alpha$-olefin includes for example propylene, 1-butene, 1-pentene, 1-hexene, 1-octene, 1-decene, 2-methyl-1-propene, 3-methyl-1-pentene, 4-methyl-1-pentene and 5-methyl-1-hexene.

The density of the ethylene-$\alpha$-olefin copolymer (D) is 0.870 to 0.940, preferably 0.885 to 0.930, more preferably 0.900 to 0.930 (g/cm$^3$).

The MFR of the ethylene-$\alpha$-olefin copolymer (D) used in the present invention is usually 0.1 to 50, preferably 0.5 to 30, more preferably 1 to 25 (g/10 min.)

The ethylene-$\alpha$-olefin copolymer (D) of the present invention is used in a proportion of 2 to 40, preferably 5 to 30wt. parts to the total 100 wt. parts of a crystalline polyolefin resin (A), ethylene-$\alpha$-olefin-non-conjugated polyene copolymer rubber (B) and ethylene-$\alpha$-olefin copolymer (D).

Other Components

The olefinic thermoplastic elastomer composition of the present invention can contain, other than the crystalline polyolefin resin (A), ethylene-$\alpha$-olefin-non-conjugated polyene copolymer rubber (B) and other rubber component (C) or ethylene-$\alpha$-olefin copolymer (D), a softening agent (E) and/or an inorganic filler (F) where deemed necessary.

The pertinent composition in the method for manufacturing the olefinic thermoplastic elastomer composition of the present invention can contain, other than the crystalline polyolefin resin (A) and ethylene-$\alpha$-olefin-non-conjugated polyene copolymer rubber (B), a softening agent (E) and/or inorganic filler (F) as needed.

The softening agents (E) may be any of those conventionally used for rubbers. Illustrative examples thereof may include petroleum softening agents, such as process oil, lubricating oil, paraffin oil, liquid paraffin, petroleum asphalt and vaseline; coal tar softening agents, such as coal tar and coal tar pitch; fatty oil softening agents, such as castor oil, linseed oil, rape oil, soybean oil and coconut oil; tall oil; rubber substitute (factice); waxes, such as beeswax, carnauba wax and lanolin; fatty acids and fatty acid salts, such as ricinolic acid, palmitic acid, stearic acid, barium stearate, calcium stearate and zinc laurate; naphthenic acid; pine oil, rosin and their derivatives; synthetic high molecular weight materials, such as terpene resin, petroleum resin, atactic polypropylene and coumarone and indene resin; ester softening agents, such as dioctyl phthalate, dioctyl adipate and dioctyl sebacate; microcrystalline wax; liquid polybutadiene; modified liquid polybutadiene; liquid thiokol; and hydrocarbon synthetic lubricating oils.

In the olefinic thermoplastic elastomer composition of the present invention, the softening agent (E) is used usually in a ratio of 2 to 100 wt. parts, preferably 5 to 80 wt. parts to the total 100 wt. parts of a crystalline polyolefin resin (A), an ethylene-$\alpha$-olefin-non-conjugated polyene copolymer rubber (B) and at least one rubber (C) selected from polyisobutylene, butyl rubber and a propylene-ethylene copolymer rubber having a propylene content of 50 mol % or more or an ethylene-α-olefin copolymer (D) having a density of 0.870 to 0.940 (g/cm³) and having an ethylene content of 85 mol % or more.

In the method for manufacturing the olefinic thermoplastic elastomer composition of the present invention, the softening agent (E) is used usually in a ratio of 2 to 100 wt. parts, preferably 5 to 80 wt. parts to the total 100 wt. parts of a crystalline polyolefin resin (A) and an ethylene-α-olefin-non-conjugated polyene copolymer rubber (B).

When the softening agent (E) is used in the ratio mentioned above, the obtained thermoplastic elastomer composition is excellent in flow property at molding and exhibits good heat resistance and heat aging resistance without the lowering of mechanical properties of molded products.

The said inorganic filler (F) includes, concretely, calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass balloon, shirasu balloon, basic magnesium sulfate whisker, calcium titanate whisker and aluminum borate whisker.

In the olefinic thermoplastic elastomer composition of the present invention, the inorganic filler (F) is used usually in a ratio of 2 to 100 wt. parts, preferably 2 to 50 wt. parts to the total 100 wt. parts of a crystalline polyolefin resin (A), an ethylene-α-olefin-non-conjugated polyene copolymer rubber (B) and at least one rubber (C) selected from polyisobutylene, butyl rubber and a propylene-ethylene copolymer rubber having a propylene content of 50 mol % or more or an ethylene-α-olefin copolymer (D) having a density of 0.870 to 0.940 (g/cm³) and having an ethylene content of 85 mol % or more.

In the method of manufacturing the olefinic thermoplastic elastomer composition of the present invention, the inorganic filler (F) is used usually in a ratio of 2 to 100 wt. parts, preferably 2 to 50 wt. parts to the total 100 wt. parts of a crystalline polyolefin resin (A) and an ethylene-α-olefin-non-conjugated polyene copolymer rubber (B).

When the amount of the inorganic filler (F) is in the ratio mentioned above, the obtained thermoplastic elastomer composition possesses good rubber elasticity and moldability.

The olefinic thermoplastic elastomer composition of the present invention can contain, other than the crystalline polyolefin resin (A), ethylene-α-olefin-non-conjugated polyene copolymer rubber (B), other rubber component (C) and/or ethylene-α-olefin copolymer (D), softening agent (E) and inorganic filler (F), an ethylene-propylene copolymer rubber (EPR) having an ethylene content of below 85 mol % and an ethylene-propylene-non-conjugated copolymer rubber (EPDM). The example of the ethylene-propylene-non-conjugated copolymer rubber includes ethylene-propylene-5-ethylidene-2-norbornene copolymer rubber and ethylene-propylene-dicyclopentadiene copolymer rubber In the olefinic thermoplastic elastomer composition of the present invention, when the ethylene-propylene copolymer rubber (EPR) and ethylene-propylene-non-conjugated diene copolymer rubber (EPDM) as above-mentioned are used, these are used usually in a ratio of 10 to 200 wt. parts, preferably 20 to 150 wt. parts to the total 100 wt. parts of a crystalline polyolefin resin (A), an ethylene-α-olefin-non-conjugated polyene copolymer rubber (B) and at least one rubber (C) selected from polyisobutylene, butyl rubber and a propylene-ethylene copolymer rubber having a propylene content of 50 mol % or more or an ethylene-α-olefin copolymer (D) having a density of 0.870 to 0.940 (g/cm³) and having an ethylene content of 85 mol % or more.

The pertinent composition in the method for manufacturing the olefinic thermoplastic elastomer composition of the present invention can contain, other than the crystalline polyolefin resin (A) and ethylene-α-olefin-non-conjugated polyene copolymer rubber (B), softening agent (E) and inorganic filler (F), other rubbers such as polyisobutylene, butyl rubber, propylene-ethylene copolymer rubber and ethylene-propylene copolymer rubber. These rubbers can be used singly or in a combination of two or more.

In the method of manufacturing the olefinic thermoplastic elastomer composition of the present invention, when the other rubbers as above-mentioned are used, they are used usually in a ratio of 2 to 200 wt. parts, preferably 5 to 150 wt. parts to the total 100 wt. parts of a crystalline polyolefin resin (A) and an ethylene-α-olefin-non-conjugated polyene copolymer rubber (B).

Further, the olefinic thermoplastic elastomer composition can contain heretofore known heat stabilizers, age resistors, weather resisting agents, anti-static agents, metal soaps and lubricants such as wax in such a range not to damage the object of the present invention.

The olefinic thermoplastic elastomer composition of the present invention is obtained by dynamically heat treating and crosslinking a mixture in the presence of the organic peroxide mentioned below, which mixture comprises a crystalline polyolefin resin (A), ethylene-α-olefin-non-conjugated polyene copolymer rubber (B), other rubber component (C) or ethylene-α-olefin copolymer (D), and softening agent (E) and/or inorganic filler (F) incorporated where deemed necessary.

The pertinent composition in the method for manufacturing the olefinic thermoplastic elastomer composition of the present invention is obtained by dynamically heat treating and crosslinking a mixture, in the presence of a crosslinking agent, preferably the below-mentioned organic peroxide, of a crystalline polyolefin resin (A) and ethylene-α-olefin-non-conjugated polyene copolymer rubber (B), and softening agent (E) and/or inorganic filler (F) incorporated where deemed necessary.

Herein, "dynamically heat treating" means kneading in the molten state.

The organic peroxide used in the present invention includes, concretely, dicumyl peroxide, di-tert-butyl peroxide, 2,5-dimethyl-2,5-di-(tert-butylperoxy)hexane, 2,5-dimethyl-2,5-di-(tert-butylperoxy)hexyne-3,1,3-bis(tert-butylperoxyisopropyl)benzene, 1,1-bis(tert-butylperoxy)-3,3,5-trimethylcyclohexane, n-butyl 4,4-bis(tert-butylperoxy)valerate, benzoyl peroxide, p-chlorobenzoyl peroxide, 2,4-dichlorobenzoyl peroxide, tert-butyl peroxybenzoate, tert-butylperoxyisopropylcarbonate, diacetyl peroxide, lauroyl peroxide and tert-butyl cumyl peroxide.

Of these, in the viewpoint of odor and scorch stability preferred are 2,5-dimethyl-2,5-di-(tert-butylperoxy)hexane, 2,5-dimethyl-2,5-di-(tert-butylperoxy)hexyne-3 and 1,3-bis(tert-butylperoxyisopropyl)benzene. Among these, 2,5-dimethyl-2,5-di-(tert-butylperoxy)hexane is most preferable.

In the olefinic thermoplastic elastomer composition of the present invention, the organic peroxide is used in an amount of usually 0.02 to 3 wt. parts, preferably 0.05 to 1 wt. part to the total 100 wt. parts of the whole to be treated, that is, crystalline polyolefin resin (A) plus ethylene-α-olefin-non-conjugated polyene copolymer rubber (B) plus other rubber component (C) or ethylene-α-olefin copolymer (D).

In the method for manufacturing the olefinic thermoplastic elastomer composition of the present invention, the organic peroxide is used in such an amount to be usually 0.02 to 3 wt. parts, preferably 0.05 to 1 wt. part to the total 100 wt. parts of the whole to be treated, that is, crystalline polyolefin resin (A) and ethylene-α-olefin-non-conjugated polyene copolymer rubber (B) and other rubbers such as polyisobutylene, butyl rubber and propylene-ethylene copolymer rubber which are incorporated as needed.

Determining the formulation amount of the organic peroxide to be the above-mentioned range yields a suitable degree of crosslinking and also affords sufficient heat resistance, tensile properties, elastic recovery, impact resilience and moldability.

Further, as crosslinking agent, a phenol resin can be used.

In the olefinic thermoplastic elastomer composition of the present invention, the amount used of the phenol resin is usually 1 to 20 wt. parts, preferably 2 to 15 wt. parts, more preferably 3 to 12 wt. parts to the total 100 wt. parts of the whole to be treated, that is, crystalline polyolefin resin (A) and ethylene-α-olefin-non-conjugated polyene copolymer rubber (B) and other rubber component (C) or ethylene-α-olefin copolymer (D).

In the method for manufacturing the olefinic thermoplastic elastomer composition of the present invention, the amount used of the phenol resin is usually 1 to 20 wt. parts, preferably 2 to 15 wt. part, more preferably 3 to 12 wt. parts against the total 100 wt. parts of the whole to be treated, that is, crystalline polyolefin resin (A) plus ethylene-α-olefin-non-conjugated polyene copolymer rubber (B) plus other rubbers such as polyisobutylene, butyl rubber and propylene-ethylene copolymer rubber which are incorporated as needed.

In the present invention, upon crosslinking treatment by said organic peroxides, there can be incorporated peroxy crosslinking aids such as sulfur, p-quinone dioxime, p,p'-dibenzoylquinone dioxime, N-methyl-N-4-dinitrosoaniline, nitrosobenzene, diphenylguanidine and trimethylolpropane-N,N'-m-phenylene dimaleimide, or divinylbenzene, triallycyanurate, polyfunctional methacrylate monomers such as ethylene glycol dimethacrylate, diethylene glycol dimethacrylate, polyethylene glycol dimethacrylate, trimethylolpropane trimethacrylate and ally methacrylate, and polyfunctional vinyl monomers such as vinyl butylate and vinyl stearate.

By using the above compounds, uniform and mild crosslinking reaction can be expected. Particularly, in the present invention, divinylbenzene is most preferable. Divinylbenzene, since being easy to handle, since being good in compatibility with the crystalline polyolefin resin (A) and ethylene-α-olefin-non-conjugated polyene copolymer rubber (B) which consitute the main component for crosslinking treatment, and since having a function of dissolving organic peroxides to work as dispersant thereof, produces the effect that the crosslinking by heat treatment is uniform to result in a thermoplastic elastomer composition balanced in flow and physical properties.

The compounds such as the above-mentioned crosslinking aids or polyfunctional vinyl monomers are used in an amount of usually 2 or less wt. parts, preferably 0.3 to 1 wt. parts to the total 100 wt. parts of the whole to be treated.

To accelerate the decomposition of the organic peroxide, there can be used such decomposition accelerators as tertiary amines such as triethylamine, tributylamine and 2,4,6-tri (dimethylamino)phenol and naphthenates of aluminum, cobalt, vanadium, copper, calcium, zirconium, manganese, magnesium, lead and mercury.

The dynamic heat treatment of the present invention is preferably conducted using a non-open type equipment, for example, mixing roll, intensive mixer (e.g., Bumbury's mixer, kneader) and single or twin screw extruder, particularly twin screw extruder being more preferable. Further, the treatment is desirably conducted under the atmosphere of inert gas such as nitrogen and carbon dioxide. The temperature of the heat treatment is, being up to 300° C. when the melting point of the crystalline polyolefin resin (A) is taken into consideration, usually 150 to 280° C., preferably 170 to 270° C. The kneading time is usually 1 to 20, preferably 1 to 10 minutes. The applied shear force is 10 to 100,000 sec$^{-1}$ in terms of the maximum shear rate generated in extruder, usually 100 to 50,000, preferably 1,000 to 10,000, more preferably 2,000 to 7,000 sec$^{-1}$.

Further, the dynamic heat treatment of the present invention is preferably conducted according to the conditions shown in the following formula, $$5.5 < 2.2 \log X + \log Y - \log Z + (T-180) \div 100 < 6.5$$

wherein T is a resin temperature (° C.) at the die exit of extruder, X is a screw diameter of extruder (mm), Y is a maximum shear rate generated in extruder (sec$^{-1}$), and Z is an extrusion amount (kg/h).

The maximum shear rate (Y) generated in extruder is shown in the following formula, $$Y(sec^{-1}) = [(\text{extruder screw diameter; } X \, (mm)) \times \pi \times (\text{screw revolution per second } (rps)] / (\text{narrowest distance } (mm) \text{ of clearance between barrel inside wall and kneading segment of screw})$$

With the above-mentioned dynamic heat treatment, there is obtained a crosslinked olefinic thermoplastic elastomer composition composed of the crystalline polyolefin resin (A), ethylene-α-olefin-non-conjugated polyene copolymer rubber (B) and, though used where deemed necessary, other rubber component (C) or ethylene-α-olefin copolymer (D).

In the method of manufacturing the olefinic thermoplastic elastomer composition of the present invention, by dynamic heat treatment according to the specified conditions shown in the foregoing formula, there is obtained an olefinic thermoplastic elastomer composition which is excellent in tensile strength, tensile elongation at break and compression set which are the important properties as a thermoplastic elastomer composition.

In the present invention, that a thermoplastic elastomer composition is crosslinked means the case where the gel content measured by the following method is preferably 20 wt. % or more, more preferably 45 wt. % or more.

Measurement of Gel Content:

A thermoplastic elastomer composition sample 100 mg is taken, cut into small pieces of 0.5 mm×0.5 mm×0.5 mm, dipped in 30 ml cyclohexane in a closed container at 23° C. for 48 hours, then taken out on a filter paper and dried at room temperature for more than 72 hours until a constant weight is obtained. From the weight of the residue after drying there are subtracted the weight of all the cyclohexane insoluble components (fibrous filler, filler, pigment, etc.) other than the polymer component and the weight of the crystalline polyolefin resin (A) in the sample before cyclohexane immersion. The value obtained thus is named "corrected final weight (Y)".

On the other hand, the weight of the ethylene-α-olefin-non-conjugated polyene copolymer rubber (B) in the sample is named "corrected initial weight (X)".

The gel content is obtained by the following formula.

Gel content [wt. %]=[corrected final weight (Y)/corrected initial weight (X)]×100

The olefinic thermoplastic elastomer composition of the present invention is superior in tensile strength and tensile elongation at break compared to the hitherto obtained olefinic thermoplastic elastomer composition.

According to the method for manufacturing the olefinic thermoplastic elastomer composition of the present invention, the invention can provide an olefinic thermoplastic elastomer composition excellent in tensile strength, tensile elongation at break and compression set compared to the conventional olefinic thermoplastic elastomer composition.

This specification includes part or all of the contents as disclosed in the specifications of Japanese Patent Applications Nos. 11(1999)-181023, 11(1999)-181025 and 11(1999)-181026, which are the base of the priority claim of the present application.

DETAILED DESCRIPTION OF THE PREFERRED EMBODIMENTS

The present invention is explained by means of examples hereinafter, but these examples are not to be considered as limiting the scope of the invention.

The methods of the physical property measurement conducted on the olefinic thermoplastic elastomer compositions in Examples and Comparative examples are as follows.

[Physical Property Measuring Method]

(1) JIS-A hardness: Hardness was measured according to JIS K6301.
(2) Tensile strength: Tensile strength at break was measured according to JIS K6301 using a speed of 200 mm/min. (unit:kg/cm$^2$)
(3) Tensile elongation: Tensile elongation at break was measured according to JIS K6301 using a speed of 200 mm/min. (unit:%)
(4) Compression set: Compression set was measured according to JIS K6301 after subjection to 25% compression at 70° C. for 22 hours. (unit: %)

PREPARATION EXAMPLE 1

Production of Ethylene-1-butene-5-ethylidene-2-norbornene Copolymer Rubber (B-1)

(1) Preliminary Contact of Zirconium Compound and Methyl Alumoxane and Preparation of Catalytic Solution A predetermined amount of a zirconium compound (rac-dimethylsilylene-bis(2-methyl-4-phenyl-1-indenyl) zirconium dichloride) and a solution of methyl alumoxane in toluene (1.2 milligram atom/ml as reduced to aluminum atom) were mixed by stirring in dark at room temperature for 30 minutes to prepare a toluene solution in which the zirconium compound and methyl alumoxane were dissolved. The toluene solution had a Zr concentration of 0.004 mmoles/ml and a methyl alumoxane concentration of 1.2 milligram atom/ml as reduced to aluminum atom.

Then, to this toluene solution, 5 volumes of hexane relative to toluene was added under stirring to prepare a catalytic solution having the following Zr concentration and methyl alumoxane concentration, which was used as a catalyst for polymerization reaction:

Zr concentration: 0.00067 mmole/ml (=0.67 mmole/liter);
Methyl alumoxane concentration (as reduced to aluminum atom): 0.20 mmole/ml (=200 mmole/liter).

(2) Polymerization

Using a 15 liter stainless polymerization vessel equipped with a stirring blade, copolymerization of ethylene, 1-butene and 5-ethylidene-2-norbornene (hereinafter referred also to "ENB") was continuously effected in the presence of the polymerization catalyst of (1) above.

Thus, into the polymerization vessel, 3.185 liters per hour of dehydrated and purified hexane, 0.67 liter per hour of the catalytic solution, 0.3 liters per hour of a solution of tri-isobutylaluminum in hexane (concentration of 17 mmole/liter) and 1.5 liters per hour of a solution of ENB in hexane (concentration of 0.02 liter/liter) were continuously supplied through the top of the polymerization vessel.

Further, 200 liters per hour of ethylene and 155 liters per hour of 1-butene were continuously supplied into the copolymerization vessel through the top thereof. This polymerization reaction was effected at 80° C. with an average residence time of one hour (i.e., polymerization scale of 5 liters).

The polymerization mixture was extracted from the bottom of the polymerization vessel and a small amount of methanol was added to stop the polymerization reaction. The mixture was then subjected to steam stripping to separate the copolymer from the solvent, which was then dried under a reduced pressure (100 mmHg) at 100° C. for 24 hours.

In the above procedures, ethylene-1-butene-ENB copolymer rubber (copolymer rubber (B-1)) was obtained at a yield of 250 g per hour. The resulting copolymer rubber (B-1) had the following properties:

(i) Molar ratio of units derived from ethylene to units derived from 1-butene (ethylene/1-butene): 79/21;
(ii) Iodine value based on ENB: 13;
(iii) Intrinsic viscosity [η] as measured in decalin at 135° C.: 2.6 dl/g;
(iv) Intensity ratio D of Tαβ to Tαα in $^{13}$C-NMR spectrum: <0.01;
(v) B value: 1.1;
(vi) Glass transition temperature (Tg) obtained by DSC: −56° C.;
(vii) gη* value: 0.67.

PREPARATION EXAMPLE 2

Preparation of Ethylene-1-butene-5-ethylidene-2-norbornene Copolymer Rubber (B-2)

An ethylene-1-butene-ENB copolymer rubber [copolymer rubber (B-2)] was obtained in the same manner as Preparation Example 1 except for using rac-dimethylsilylene-bis(2-ethyl-4-isopropyl-7-methyl-1-indenyl)zirconium dichloride in place of the zirconium compound used in Preparation Example 1 (1) (i.e., rac-dimethylsilylene-bis(2-methyl-4-phenyl-1-indenyl) zirconium dichloride.). The properties of the obtained copolymer rubber (B-2) are shown in the following.

(i) Molar ratio of units derived from ethylene to units derived from 1-butene (ethylene/1-butene): 79/21
(ii) Iodine value based on ENB: 10
(iii) Intrinsic viscosity [η] as measured in decalin at 135° C.: 2.7 dl/g
(iv) Intensity ratio D of Tαβ to Tαα in $^{13}$C-NMR spectrum: <0.01
(v) B value: 1.1
(vi) Glass transition temperature (Tg) obtained by DSC: −56° C.
(vii) gη* value: 0.98

PREPARATION EXAMPLE 3

Preparation of Ethylene-propylene-5-vinyl-2-norbornene Copolymer Rubber (B-3)

Using a stainless polymerization reactor having a substantial content volume of 100 liter which is equipped with a stirring blade (rotation: 250 rpm), there was conducted continuous copolymerization of ethylene, propylene and 5-vinyl-2-norbornene.

Namely, into the liquid phase from the side of the polymerization reactor there were continuously supplied dehydrated and purified hexane at 60 L/hour, ethylene at 3.6 kg/hour, propylene at 3.0 kg/hour, 5-vinyl-2-norbornene at 320 g/hour, hydrogen at 40 L/hour, as catalyst (a) $VOCl_3$ at 32 millimol/hour, (b) diethylaluminum chloride ($Al(Et)_2Cl$) at 160 millimol/hour and $Al(Et)_{1.5}Cl_{1.5}$ at 32 millimol/hour. The copolymerization was conducted at 40° C.

The copolymerization according to the said conditions gave an ethylene-propylene-5-vinyl-2-norbornene copolymer in the state of a homogeneous solution. A small quantity of methanol was added in the polymerization solution continuously extracted from the bottom of the polymerization reactor to terminate the polymerization reaction, and the copolymer, after separated from the solvent by steam stripping treatment, was dried under reduced pressure at 55° C. for 48 hours.

The properties of the copolymer rubber (B-3) obtained as above-mentioned are shown in the following.
(i) Molar ratio of units derived from ethylene to units derived from propylene (ethylene/propylene): 75/25
(ii) Iodine value based on 5-vinyl-2-norbornene: 8.5
(iii) Intrinsic viscosity [η] as measured in decalin at 135° C.: 2.81 dl/g
(iv) Intensity ratio D of Tαβ to Tαα in $^{13}$C-NMR spectrum: <0.01
(v) B value: 1.0
(vi) Glass transition temperature (Tg) obtained by DSC: −53° C.
(vii) gη* value: 0.81

PREPARATION EXAMPLE 4

Preparation of Ethylene-propylene-5-ethylidene-2-norbornene Copolymer Rubber (B-4)

Using the known vanadium catalyst ($VOCl_2(OC_2H_5)$), copolymerization carried out of ethylene, propylene and 5-ethylidene-2-norbornene. The properties of the copolymer rubber obtained (B-4) are shown hereunder.

(i) Molar ratio of units derived from ethylene to units derived from propylene (ethylene/propylene): 79/21
(ii) Iodine value based on ENB: 13
(iii) Intrinsic viscosity [η] as measured in decalin at 135° C.: 2.7 dl/g
(iv) Intensity ratio D of Tαβ to Tαα in $^{13}$C-NMR spectrum: <0.01
(v) B value: 1.0
(vi) Glass transition temperature (Tg) obtained by DSC: −51° C.
(vii) gη* value: 0.97

EXAMPLE 1

In a Bumbury's mixer there were placed 60 wt. parts of ethylene-1-butene-5-ethylidene-2-norbornene copolymer rubber (B-1), 20 wt. parts of propylene homopolymer (A-1) (MFR 10 g/10 min.), 20 wt. parts of butyl rubber (C-1) (MFR 0.6 g/10 min., unsaturation degree 0.7 mol %) and 33 wt. parts of mineral oil type softening agent (E-1) (paraffinic process oil made by Idemitsu Kosan Co. Ltd., trade name; Diana Process PW-380). The mixture was kneaded at 180° C. for 7 minutes, formed into a sheet through an open roll and cut with a sheet cutter to make square pellets. Then the square pellets were added with 0.4 wt. part of an organic peroxide [2,5-dimethyl-2,5-di-(tert-butylperoxy)hexane] and 0.4 wt. part of divinylbenzene (DVB), fully mixed in a Henschel mixer and thereafter fed to a twin-screw extruder to subject to the dynamic heat treatment to obtain the pellets of a thermoplastic elastomer composition. The pellets were formed into predetermined test specimens by injection molding, and the physical properties thereof were measured according to the said measuring methods. The results are shown in Table 1.

EXAMPLES 2 TO 4, COMPARATIVE EXAMPLES 1 TO 4

The thermoplastic elastomer composition were produced in the same manner as Example 1, using the raw materials and formulations shown in Table 1, and the physical properties were measured. The results are shown in Table 1.

The properties of the propylene-ethylene copolymer (C-2) used in Examples 2 to 4 are as follows.
Propylene content: 59 mol %, MFR: 1.4 g/10 min.

TABLE 1

|  |  | Ex. 1 | Ex. 2 | Com. Ex. 1 | Ex. 3 | Com. Ex. 2 | Ex.4 | Com. Ex. 3 | Com. Ex. 4 |
| --- | --- | --- | --- | --- | --- | --- | --- | --- | --- |
| Crystalline polyolefin resin | A-1 | 20 | 20 | 20 | 35 | 35 | 35 | 20 | 20 |
| Ethylene-α-olefin-non-conjugated polyene copolymer | B-1 | 60 | 60 | 80 | 50 | 65 | 50 | 60 | 60 |
| Other rubber | C-1 | 20 |  |  |  |  |  | 20 | 20 |
|  | C-2 |  | 20 |  | 15 |  | 15 |  |  |
| Softening agent | E-1 | 33 | 33 | 33 |  |  |  | 33 | 33 |
| Inorganic filler | F-1 |  |  |  |  |  | 8 |  |  |
| Organic peroxide |  | 0.4 | 0.4 | 0.4 | 0.35 | 0.35 | 0.35 | 0.4 | 0.4 |
| Divinylbenzene |  | 0.4 | 0.4 | 0.4 | 0.5 | 0.5 | 0.5 | 0.4 | 0.4 |
| Extruder |  | A | B | A | A | A | A | A | A |
| Temperature pattern |  | B | A | B | A | A | A | A | A |
| X |  | 53 | 30 | 53 | 53 | 53 | 53 | 53 | 53 |
| Y |  | 3200 | 2300 | 3200 | 1600 | 1600 | 1600 | 1000 | 3800 |
| Z |  | 60 | 10 | 60 | 40 | 40 | 40 | 100 | 20 |
| T |  | 232 | 216 | 238 | 209 | 218 | 214 | 212 | 258 |
| (1) formula |  | 6.04 | 5.97 | 6.10 | 5.69 | 5.78 | 5.74 | 5.11 | 6.85 |

TABLE 1-continued

|  | Ex. 1 | Ex. 2 | Com. Ex. 1 | Ex. 3 | Com. Ex. 2 | Ex.4 | Com. Ex. 3 | Com. Ex. 4 |
|---|---|---|---|---|---|---|---|---|
| Physical property, moldability | | | | | | | | |
| JIS-A hardness | 62 | 64 | 65 | 93 | 92 | 94 | 61 | 62 |
| Tensile strength | 64 | 61 | 66 | 128 | 134 | 136 | 38 | 45 |
| Elongation at break | 640 | 610 | 620 | 640 | 650 | 610 | 310 | 370 |
| Appearance of injection molded product | ○ | ○ | Δ | ○ | Δ | ○ | Δ | ○ |
| Appearance of extrusion molded product | ○ | ○ | Δ | ○ | Δ | ○ | x | ○ |

[Ex. = Example, Com. Ex. = Comparative Example]

Inorganic filler (F-1): Talc (made by Matsumura Sangyo Co., ET-5) Evaluation standards of appearance of injection molded product:

Mark ○; flow mark is not perceived

Mark Δ; flow mark is perceived partly

Mark ×; flow mark is perceived on almost whole surface
Evaluation standards of appearance of extrusion molded product:

Mark ○; surface of molded product is smooth

Mark Δ; surface of molded product is a little rough

Mark ×; surface of molded product is considerably rough
Extruder:

A; twin-screw extruder, Werner & Pfleiderer type ZSK-53, screw diameter 53 mm

B; twin-screw extruder, Ikegai Corp. type PCM-30
Extruder temperature setting:

A; C1/C2/C3/C4/C5/D=150/170/190/220/210/200 (° C.)

B; C1/C2/C3/C4/C5/D=150/170/190/230/230/210 (° C.)

The formula (1) in Table 1 is as follows.

$$5.5 < 2.2\log X + \log Y - \log Z + (T-180) \div 100 < 6.5$$

wherein T is a resin temperature (° C.) at the die exit of twin-screw extruder, X is a screw diameter (mm) of twin-screw extruder, Y is the maximum shear rate ($sec^{-1}$) generated in twin-screw extruder, and Z is an extrusion amount (kg/hr).

EXAMPLE 5

In a Bumbury's mixer there were placed 55 wt. parts of ethylene-1-butene-5-ethylidene-2-norbornene copolymer rubber (B-1), 26 wt. parts of propylene homopolymer (A-1) (MFR 10 g/10 min.), 19 wt. parts of ethylene-4-methyl-1-pentene random copolymer (D-1) (ethylene content 97 mol %, density 0.920 g/cm$^3$, MFR(190 AC)=20 g/10 min.) and 28 wt. parts of mineral oil type softening agent (E-1) (paraffinic process oil made by Idemitsu Kosan Co. Ltd., trade name; Diana Process PW-380). The mixture was kneaded at 180° C. for 7 minutes, formed into a sheet through an open roll and cut with a sheet cutter to make square pellets. Then the square pellets were added with 0.27 wt. part of an organic peroxide [2,5-dimethyl-2,5-di-(tert-butylperoxy)hexane] and 0.4 wt. part of divinylbenzene (DVB), fully mixed in a Henschel mixer and thereafter fed to a twin-screw extruder to subject to the dynamic heat treatment to obtain the pellets of a thermoplastic elastomer composition. The pellets were formed into predetermined test specimens by injection molding, and the physical properties thereof were measured according to the said measuring methods. The results are shown in Table 2.

EXAMPLE 6, COMPARATIVE EXAMPLE 5 TO 8

The thermoplastic elastomer composition were produced in the same manner as Example 5, using the raw materials and formulations shown in Table 2, and the physical properties were measured. The results are shown in Table 2.

TABLE 2

|  |  | Ex. 5 | Com. Ex. 5 | Ex. 6 | Com. Ex. 6 | Com. Ex. 7 | Com. Ex. 8 |
|---|---|---|---|---|---|---|---|
| Crystalline polyolefin resin | A-1 | 26 | 30 | 26 | 26 | 26 | 26 |
| Ethylene-α-olefin-non-conjugated polyene copolymer | B-1 | 55 | 70 | 55 | 55 | 55 | 55 |
| Crystalline ethylene-α-olefin copolymer | D-1 | 19 | | | | 19 | 19 |
|  | D-2 | | | 19 | | | |
|  | D-3 | | | | 19 | | |
| Softening agent | E-1 | 28 | 28 | 28 | 28 | 28 | 28 |
| Organic peroxide | | 0.27 | 0.27 | 0.27 | 0.27 | 0.27 | 0.27 |
| Divinylbenzene | | 0.4 | 0.4 | 0.4 | 0.4 | 0.4 | 0.4 |
| Extruder | | A | A | B | B | A | A |
| Temperature pattern | | A | A | B | B | A | A |
| X | | 53 | 53 | 30 | 30 | 53 | 53 |
| Y | | 2000 | 2000 | 3200 | 3200 | 1200 | 3500 |
| Z | | 60 | 60 | 15 | 15 | 150 | 20 |
| T | | 226 | 222 | 235 | 247 | 210 | 267 |
| (1)formula | | 5.78 | 5.74 | 6.13 | 6.25 | 5.00 | 6.91 |
| JIS-A hardness | | 81 | 82 | 79 | 88 | 79 | 80 |
| Tensile strength | | 108 | 82 | 103 | 85 | 45 | 61 |
| Elongation at break | | 680 | 540 | 670 | 480 | 280 | 350 |

[Ex. = Example, Com. Ex. = Comparative Example]

Ethylene-1-butene random copolymer (D-2): ethylene content 89 mol %, density 0.890 g/cm$^3$, MFR (190° C.)=8 g/10 min.

Ethylene-propylene random copolymer (D-3): ethylene content 99 mol %, density 0.956 g/cm$^3$, MFR (190° C.)=9 g/10 min.

Extruder:
  A; twin-screw extruder, Werner & Pfleiderer type ZSK-53, screw diameter 53 mm
  B; twin-screw extruder, Ikegai Corp. type PCM-30

Extruder temperature setting:
  A; C1/C2/C3/C4/C5/D=150/170/190/220/220/200 (° C.)
  B; C1/C2/C3/C4/C5/D=150/170/190/230/230/210 (° C.)

The formula (1) in Table 2 is as follows.

$$5.5 < 2.2 \log X + \log Y - \log Z + (T-180) \div 100 < 6.5$$

wherein T is a resin temperature (° C.) at the die exit of twin-screw extruder, X is a screw diameter (mm) of twin-screw extruder, Y is the maximum shear rate (sec$^{-1}$) generated in twin-screw extruder, and Z is an extrusion amount (kg/hr).

EXAMPLE 7

In a Bumbury's mixer there were placed 45 wt. parts of ethylene-1-butene-5-ethylidene-2-norbornene copolymer rubber (B-1), 30 wt. parts of propylene homopolymer (A-1) (MFR 10 g/10 min.) and 25 wt. parts of mineral oil type softening agent (E-1) (paraffinic process oil made by Idemitsu Kosan Co. Ltd., trade name; Diana Process PW-380). The mixture was kneaded at 180° C. for 7 minutes, formed into a sheet through an open roll and cut with a sheet cutter to make square pellets. Then the square pellets were added with 0.27 wt. part of an organic peroxide [2,5-dimethyl-2,5-di-(tert-butylperoxy)hexane] and 0.4 wt. part of divinylbenzene (DVB), fully mixed in a Henschel mixer and thereafter fed to a twin-screw extruder to subject to the dynamic heat treatment of the following conditions to obtain the pellets of a thermoplastic elastomer composition.

Dynamic heat treatment conditions:
Extruder: Werner & Pfleiderer type ZSK-53, screw diameter 53 mm Temperature setting;
C1/C2/C3/C4/C5/D=140/160/180/220/220/200 (° C.)
Maximum shear rate; 2800 (sec$^{-1}$)
Extrusion amount; 50 (kg/h)
Resin temperature at die exit; 238 (° C.)

Then the pellets were formed into predetermined test specimens by injection molding, and the properties of the specimens were measured according to the foregoing measuring methods.

Further, the appearance of extrusion molded products was evaluated using a single screw extruder made by Toshiba Mach. Co. Ltd. (screw diameter 50 mm, L/D=30, CR=3.2) and Garvey Type Die (ASTM D2230).
(C1/C2/C3/C4/C5/D=160/180/200/210/210/200 (° C.), screw revolution 30 rpm)

Evaluation standards of appearance of extrusion product:
  Mark ○; surface of extrusion molded product is smooth
  Mark Δ; surface of extrusion molded product is a little rough
  Mark ×; surface of extrusion molded product is rough The results are shown in Table 3.

EXAMPLES 8 TO 10, COMPARATIVE EXAMPLES 9 TO 16

The thermoplastic elastomer compositions were produced in the same manner as Example 7, using the raw materials and formulations shown in Table 3. The physical properties were measured, and the appearance of extrusion molded products were evaluated. The results are shown in Table 3.

TABLE 3

|  |  | Ex. 7 | Com. Ex. 9 | Com. Ex. 10 | Ex. 8 | Com. Ex. 11 | Com. Ex. 12 | Ex. 9 | Com. Ex. 13 | Com. Ex. 14 | Ex. 10 | Com. Ex. 15 | Com. Ex. 16 |
|---|---|---|---|---|---|---|---|---|---|---|---|---|---|
| Crystalline polyolefin resin | A-1 | 40 | 40 | 40 | 40 | 40 | 40 | 40 | 40 | 40 | 40 | 40 | 40 |
| Ethylene-α-olefin-non-conjugated polyene copolymer | B-1 | 60 | 60 | 60 | | | | | | | | | |
|  | B-2 | | | | 60 | 60 | 60 | | | | | | |
|  | B-3 | | | | | | | 60 | 60 | 60 | | | |
|  | B-4 | | | | | | | | | | 60 | 60 | 60 |
| Softening agent | E-1 | 33 | 33 | 33 | 33 | 33 | 33 | 33 | 33 | 33 | 33 | 33 | 33 |
| Organic peroxide |  | 0.4 | 0.4 | 0.4 | 0.4 | 0.4 | 0.4 | 0.6 | 0.6 | 0.6 | 0.4 | 0.4 | 0.4 |
| Divinylbenzene |  | 0.6 | 0.6 | 0.6 | 0.6 | 0.6 | 0.6 | 0.6 | 0.6 | 0.6 | 0.6 | 0.6 | 0.6 |
| X |  | 53 | 53 | 53 | 53 | 53 | 53 | 53 | 53 | 53 | 53 | 53 | 53 |
| Y |  | 2800 | 2000 | 4000 | 2800 | 2000 | 4000 | 2800 | 1500 | 4000 | 2800 | 1500 | 4000 |
| Z |  | 50 | 100 | 30 | 50 | 100 | 30 | 50 | 100 | 30 | 50 | 100 | 30 |
| T |  | 238 | 209 | 275 | 240 | 210 | 279 | 248 | 214 | 286 | 240 | 208 | 277 |
| (1)formula |  | 6.12 | 5.38 | 6.87 | 6.14 | 5.39 | 6.91 | 6.22 | 5.31 | 6.98 | 6.14 | 5.25 | 6.89 |
| Physical property |  |  |  |  |  |  |  |  |  |  |  |  |  |
| Tensile strength |  | 95 | 52 | 64 | 99 | 56 | 69 | 104 | 60 | 74 | 79 | 44 | 53 |
| Elongation at break |  | 690 | 350 | 440 | 710 | 360 | 470 | 670 | 330 | 430 | 530 | 300 | 370 |
| Compression set |  | 43 | 49 | 48 | 42 | 49 | 47 | 38 | 44 | 42 | 45 | 53 | 51 |
| Appearance of extrusion molded product |  | ○ | Δ | ○ | ○ | Δ | ○ | ○ | Δ | ○ | ○ | Δ | ○ |

[Ex. = Example, Com. Ex. = Comparative Example]

The formula (1) in Table 3 is as follows.

$$5.5 < 2.2 \log X + \log Y - \log Z + (T-180) \div 100 < 6.5$$

wherein T is a resin temperature (° C.) at the die exit of twin-screw extruder, X is a screw diameter (mm) of twin-screw extruder, Y is the maximum shear rate (sec$^{-1}$) generated in twin-screw extruder, and Z is an extrusion amount (kg/hr).

All the publications, patents and patent applications cited herein are incorporated herein by reference in their entirely.

What is claimed is:

1. A method for an olefinic thermoplastic elastomer composition comprising dynamically heat treating, in the presence of a crosslinking agent under the following conditions, 10 to 60 weight parts of a crystalline polyolefin resin (A) and 90 to 40 weight parts of an ethylene-α-olefin-non-conjugated polyene copolymer rubber (B) consisting of ethylene, an α-olefin having 3 to 20 carbon atoms and a non-conjugated polyene said conditions being according to the following formula, $$5.5<2.2\ log X+log Y-log Z+(T-180)\div100<6.5$$

wherein T is a resin temperature (° C.) at the die exit of a twin-screw extruder, X is a screw diameter (mm) of the twin-screw extruder, Y is a maximum shear rate (sec$^{-1}$) generated in the twin-screw extruder and Z is an extrusion amount (kg/h).

2. The manufacturing method according to claim 1, wherein said ethylene-α-olefin-non-conjugated polyene copolymer rubber (B) is obtained by random copolymerization of ethylene, an α-olefin having 3 to 20 carbon atoms and a non-conjugated polyene, has (1) the unit (a) derived from ethylene and the unit (b) derived from the α-olefin of 3 to 20 carbon atoms in a molar ratio of 40/60 to 95/5 ((a)/(b)), has (2) an iodine value of 1 to 50, and has (3) an intrinsic viscosity [η] measured in decalin at 135° C. of 0.1 to 10 dl/g.

3. The manufacturing method according to claim 1 wherein said crosslinking agent is an organic peroxide.

4. A method for manufacturing an olefinic thermoplastic elastomer composition comprising dynamically heat treating, according to the conditions shown in the following formula in the presence of a crosslinking agent, 10 to 60 weight parts of a crystalline polyolefin resin (A), 88 to 38 weight parts of an ethylene-α-olefin-non-conjugated polyene copolymer rubber (B) which is an ethylene-α-olefin-non-conjugated polyene copolymer rubber consisting of ethylene, an α-olefin having 3 to 20 carbon atoms and a non-conjugated polyene, which is obtained by random copolymerization of ethylene, an α-olefin having 3 to 20 carbon atoms and a non-conjugated polyene in the presence of a metallocene catalyst, (1) which has the ethylene-derived unit (a) and the unit (b) derived from the x-olefin with 3 to 20 carbon atoms in a molar ratio (a)/(b) of 40/60 to 95/5, (2) which has an iodine value of 1 to 50 and (3) which has an intrinsic viscosity [η] of 1.0 to 10 dl/g when measured in decalin at 135° C., and 2 to 30 weight parts of at least one rubber (C) selected from the group consisting of polyisobutylene, butyl rubber and a propylene-ethylene copolymer rubber having a propylene content of 50 mol % or more, said formula being, $$5.5<2.2\ log X+log Y-log Z+(T-180)\div100<6.5$$

wherein T is a resin temperature (° C.) at the die exit of a twin-screw extruder, X is a screw diameter (mm) of the twin-screw extruder, Y is a maximum shear rate (sec$^{-1}$) generated in the twin-screw extruder and Z is an extrusion amount (kg/h).

5. A method for manufacturing an olefinic thermoplastic elastomer composition comprising dynamically heat treating, according to the conditions shown in the following formula in the presence of a crosslinking agent, 10 to 60 weight parts of a crystalline polyolefin resin (A), 88 to 38 weight parts of an ethylene-α-olefin-non-conjugated polyene copolymer rubber (B) which is an ethylene-α-olefin-non-conjugated polyene copolymer rubber consisting of ethylene, an α-olefin having 3 to 20 carbon atoms and a non-conjugated polyene in the presence of a metallocene catalyst, (1) which has the ethylene-derived unit (a) and the unit (b) derived from the α-olefin with 3 to 20 carbon atoms in a molar ratio (a)/(b) of 40/60 to 95/5, (2) which has an iodine value of 1 to 50 and (3) which has an intrinsic viscosity [η] of 1.0 to 10 dl/g when measured in decalin at 135° C., and 2 to 40 weight parts of an ethylene-α-olefin copolymer (D) having a density of 0.870 to 0.940 (g/cm$^3$) and having an ethylene content of 85 mol % or more, said formula being;

$$5.5<2.2\ log X+log Y-log Z+(T-180)\div100<6.5$$

wherein T is a resin temperature (° C.) at the die exit of a twin-screw extruder, X is a screw diameter (mm) of the twin-screw extruder, Y is a maximum shear rate (sec$^{-1}$) generated in the twin-screw extruder and Z is an extrusion amount (kg/h).

* * * * *